(12) United States Patent
Hirata et al.

(10) Patent No.: US 8,760,056 B2
(45) Date of Patent: Jun. 24, 2014

(54) ELECTRON EMITTING ELEMENT, DEVICES UTILIZING SAID ELEMENT, AND METHOD FOR PRODUCING SAID ELEMENT

(75) Inventors: Kanako Hirata, Osaka (JP); Hiroyuki Hirakawa, Osaka (JP); Ayae Nagaoka, Osaka (JP); Yasuo Imura, Osaka (JP); Tadashi Iwamatsu, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 685 days.

(21) Appl. No.: 13/032,983

(22) Filed: Feb. 23, 2011

(65) Prior Publication Data

US 2012/0074874 A1 Mar. 29, 2012

(30) Foreign Application Priority Data

Feb. 24, 2010 (JP) ................................. 2010-038807

(51) Int. Cl.
*H01J 7/24* (2006.01)

(52) U.S. Cl.
USPC .................................................... 315/111.81

(58) Field of Classification Search
USPC .............................. 315/500, 505, 506, 111.81
See application file for complete search history.

(56) References Cited

U.S. PATENT DOCUMENTS

| | | | |
|---|---|---|---|
| 2006/0121660 A1* | 6/2006 | Rhee et al. | 438/197 |
| 2008/0088776 A1* | 4/2008 | Ishigaki et al. | 349/114 |
| 2010/0278561 A1 | 11/2010 | Kanda et al. | |

FOREIGN PATENT DOCUMENTS

| | | |
|---|---|---|
| JP | 01-298623 | 12/1989 |
| JP | 11-297190 | 10/1999 |
| JP | 2000-311640 | 11/2000 |
| JP | 2001-035354 | 2/2001 |
| JP | 2009-146891 A | 7/2009 |

* cited by examiner

*Primary Examiner* — Douglas W Owens
*Assistant Examiner* — Jianzi Chen
(74) *Attorney, Agent, or Firm* — Nixon & Vanderhye, P.C.

(57) ABSTRACT

The present invention provides an electron emitting element, comprising: a first electrode; an insulating fine particle layer formed on the first electrode and composed of insulating fine particles; and a second electrode formed on the insulating fine particle layer, wherein the insulating fine particle layer is provided with recesses formed in a surface thereof, the surface facing the second electrode, the recesses each having a depth smaller than a thickness of the insulating fine particle layer, and when a voltage is applied between the first electrode and the second electrode, electrons provided from the first electrode are accelerated in the insulating fine particle layer to be emitted though the second electrode.

22 Claims, 16 Drawing Sheets

ELECTRON EMITTING ELEMENT, DEVICES UTILIZING SAID ELEMENT, AND METHOD FOR PRODUCING SAID ELEMENT

CROSS-REFERENCE TO RELATED APPLICATION

This application is related to Japanese Patent Application No. 2010-38807 filed on Feb. 24, 2010, whose priority is claimed and the disclosure of which is incorporated by reference in its entirety.

BACKGROUND OF THE INVENTION

1. Field of the Invention

The present invention relates to an electron emitting element that emits electrons in response to application of a voltage; and a method for producing the electron emitting element.

2. Description of the Related Art

Electron emitting elements comprising a Spindt-type electrode and a carbon nanotube (CNT) electrode are known as conventional electron emitting elements. Applications of such conventional electron emitting elements to, for example, the field of Field Emission Display (FED) have been studied. Such electron emitting elements are caused to emit electrons by tunnel effect resulting from an intense electric field of approximately 1 GV/m that is formed by application of a voltage to a pointed section.

However, these two types of electron emitting elements have the intense electric field in the vicinity of a surface of an electron emitting section. Accordingly, electrons emitted obtain a large amount of energy due to the electric field to be more likely to ionize gas molecules. Cations generated due to the ionization of gas molecules are accelerated toward and collide with a surface of the element due to the intense electric field. This causes a problem of breakdown of the element due to sputtering. Further, ozone is generated before ions are generated, because oxygen in the atmosphere has dissociation energy that is lower than ionization energy. Ozone is harmful to human bodies and oxidizes various substances because of its strong oxidizing power. This causes a problem in that members around the element are damaged. In order to prevent this problem, the members around the element are limited to materials having high resistance to ozone.

With such background, MIM (Metal Insulator Metal) type and MIS (Metal Insulator Semiconductor) type electron emitting elements have been developed as other types of electron emitting elements. These electron emitting elements are surface-emission-type electron emitting elements, which accelerate electrons by utilizing quantum size effect and an intense electric field in the element so that electrons are emitted from a flat surface of the element. These electron emitting elements do not require an intense electric field outside the elements, because the electrons accelerated in an electron acceleration layer in the elements are emitted to the outside. The MIM type and the MIS type electron emitting elements can therefore overcome the problem of breakdown of the element by sputtering due to ionization of gas molecules and the problem of ozone generation, which are likely in the Spindt-type, CNT type, and BN type electron emitting elements.

However, such electron emitting elements are generally prone to pin holes or dielectric breakdown. Against this problem, there is a known technique to prevent the pinholes and the dielectric breakdown by using an insulating film having fine particles in such electron emitting elements. For example, an MIM type electron emitting element provided with an insulator containing fine particles between two sheets of electrodes opposed to each other is known (see Japanese Unexamined Patent Publication No. HEI 1(1989)-298623, for example). In addition, an electron emitting element is known, comprising a carbon nanotube electrode in which an insulating film formed of a powder layer composed of insulating particles and a fixed layer composed of an oxide insulator and formed so as to cover the powder layer is disposed between an electron emitting section formed of a carbon-based electron emitting material and an electron extraction electrode disposed on the electron emitting section for extracting electrons from the electron emitting section (see Japanese Unexamined Patent Publication No. 2000-311640, for example).

While these electron emitting elements have an insulating film as its component, however, the insulating film may cause decrease in the amount of electrons being emitted from the electron emitting element in some cases where the film is so thick that the electric resistance thereof increases. It is therefore necessary to apply a higher voltage to the electron emitting element; so development of an electron emitting element that can emit a sufficient amount of electrons by application of a moderate voltage has been desired. In addition, the insulating film may shorten the time for the electron emitting element to continuously operate in some cases where the film is so thin that it is difficult to form a uniform insulating film and a dielectric breakdown is more likely to occur. Development of an electron emitting element that can continuously operate for a longer time has been therefore desired.

SUMMARY OF THE INVENTION

In view of the above-described circumstances, the present invention has been achieved to provide an electron emitting element that can emit a sufficient amount of electrons by application a moderate voltage. The present invention also provides an electron emitting element that can continuously operate for a longer time.

According to an aspect of the present invention, there is provided an electron emitting element, comprising: a first electrode; an insulating fine particle layer formed on the first electrode and composed of insulating fine particles; and a second electrode formed on the insulating fine particle layer, wherein the insulating fine particle layer is provided with recesses formed in a surface thereof, the surface facing the second electrode, the recesses each having a depth smaller than a thickness of the insulating fine particle layer, and when a voltage is applied between the first electrode and the second electrode, electrons provided from the first electrode are accelerated in the insulating fine particle layer to be emitted though the second electrode.

The inventors of the present invention made intensive studies to achieve the above-described object. As a result, the inventors of the present invention found that the amount of electrons being emitted by an electron emitting element could be improved by forming an insulating fine particle layer composed of insulating fine particles between electrodes of the electron emitting element and forming recesses each having a depth smaller (or shallower) than the thickness of the insulating fine particle layer in a surface of the insulating fine particle layer, to reach completion of the present invention. The present invention can provide an electron emitting element that can emit sufficient electrons at a moderate voltage.

DESCRIPTION OF THE PREFERRED EMBODIMENTS

Figure 1:
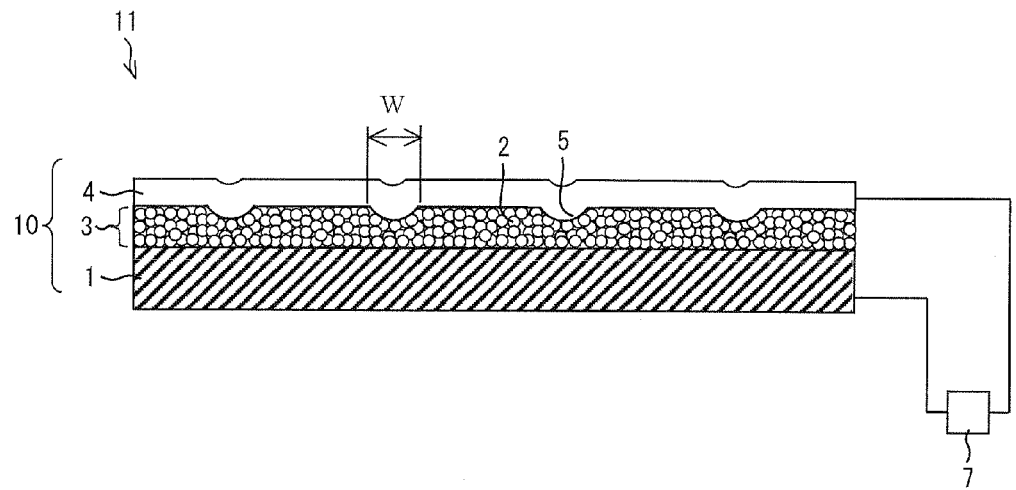
FIG. 1 is a schematic view illustrating a configuration of an electron emitting element according to an embodiment of the present invention.

An electron emitting element of the present invention comprises: a first electrode; an insulating fine particle layer formed on the first electrode and composed of insulating fine particles; and a second electrode formed on the insulating fine particle layer, wherein the insulating fine particle layer is provided with recesses formed in a surface thereof, the surface facing the second electrode, the recesses each having a depth smaller than a thickness of the insulating fine particle layer, and when a voltage is applied between the first electrode and the second electrode, electrons provided from the first electrode are accelerated in the insulating fine particle layer to be emitted though the second electrode.

The electron emitting element of the present invention is considered to emit electrons through the following mechanism. That is, when a voltage is applied between the first electrode and the second electrode, electrons moves from the first electrode to surfaces of the insulating fine particles in the insulating fine particle layer provided between the first electrode and the second electrode. Since the resistance inside of the insulating fine particles is high, the electrons are conducted through the surfaces of the insulating fine particles. On this occasion, the electrons are trapped at impurities on the surfaces of the insulating fine particles, oxygen defect that may be caused when the insulating fine particles are an oxide or points of contact among the insulating fine particles. These trapped electrons work as fixed charges. As a result, on the surface of the insulating fine particle layer, the applied voltage together with an electric field formed by the trapped electrons form an intense electric field, and the electrons are accelerated by the intense electric field to be emitted from the second electrode.

On the other hand, when the mechanism is seen from a macro viewpoint in terms of the insulating fine particle layer, the insulating fine particle layer is provided with recesses each having a depth smaller than the thickness of the insulating fine particle layer on its surface facing the second electrode, and therefore the insulating fine particle layer is thinner and has a smaller electric resistance in the recesses. Thus, intense electric fields are formed locally in the recesses. As a result, the electrons will be more likely to be emitted around the recesses to increase the amount of electrons being emitted from the second electrode.

According to the above-described mechanism, the electron emitting element of the present invention can emit a sufficient amount of electrons at a moderate voltage. While conventional MIS elements needed application of a voltage of approximately 100 V to emit a sufficient amount of electrons, the electron emitting element of the present invention can emit a sufficient amount of electrons at a voltage of less than approximately 15 V.

The first electrode is a conductor or a semiconductor for applying a voltage to the insulating fine particle layer, and may be a single structure or a structure consisting of a plurality of structures. For example, the first electrode may be a metal plate or a metal film formed on an insulator (such as an aluminum film formed on a glass substrate). The first electrode includes a so-called electrode substrate.

In addition to the above-described configuration, the electron emitting element of the present invention may have the recesses coated with a carbon thin film. Such a configuration provides an electron emitting element that can not only emit a sufficient amount of electrons at a moderate voltage but also continuously operate for a longer time, hardly causing a dielectric breakdown.

In the thus configured electron emitting element, the insulating fine particle layer is provided with the recesses each having a depth smaller (or shallower) than the thickness of the insulating fine particle layer on its surface facing the second electrode. When this electron emitting element is subjected to an aging test (for example, a continuous operating test over a long period), therefore, the electric fields will be continuously concentrated on the recesses, and the electron emitting element will continuously suffer from local voltage/current stress. Then, the element will easily have defects in the recesses, and the defects will generate a current path leading to dielectric breakdown when the number thereof increases. However, when the electron emitting element of the present invention is provided with a carbon thin film between the second electrode and the insulating fine particle layer, the carbon thin film functions as a resistor (the electric resistance of the carbon thin film is higher than that of the second electrode formed of gold, silver or the like, for example), and therefore the local and continuous voltage/current stress will be relieved. As a result, defects will be hardly generated, and the dielectric breakdown will be hardly caused.

Preferably, the carbon thin film is formed to have a film thickness of 5 nm to 20 nm. This range of the film thickness is preferable because the film thickness of less than 5 nm is insufficient for the carbon thin film to function as a resistor, and the film thickness of more than 20 nm will prevent a voltage necessary for electron emission to be applied sufficiently.

The recesses provided to the electron emitting element of the present invention may be obtained by forming a layer containing insulating fine particles and organic fine particles on the first electrode so that the layer has a depth larger than the organic fine particles, and then decomposing the organic fine particles. For example, the recesses may be obtained by applying a dispersion containing insulating fine particles and organic fine particles dispersed therein onto the first electrode to form a layer containing the insulating fine particles and the organic fine particles, and then heat-treating the layer formed. This embodiment can provide an electron emitting element that can emit sufficient electrons at a moderate voltage, because the element is provided with the recesses obtained by decomposing the organic fine particles in the insulating fine particle layer and using the organic fine particles as their molds. In addition, the size of the recesses can be readily varied, and the electric resistance in the recesses can be varied to locally adjust the magnitude of the electric fields by selecting a desired size of the organic fine particles. Thus, there is provided an electron emitting element having a configuration capable of adjusting the amount of electrons being emitted to a desired range.

Furthermore, the maximum diameter of each recess is preferably 5 nm to 1000 nm. When the maximum diameter of each recess is smaller than 5 nm, the electrical resistance in the recesses of the insulating fine particle layer does not decrease to discourage formation of the locally intense electric fields, and when the width of the recesses is larger than 1000 nm, the electric resistance of the insulating fine particle layer will decrease too much in the recesses to encourage current leakage. As a result, the electric fields on the insulating fine particle layer weaken to discourage emission of electrons. Accordingly, the maximum diameter is preferably in the above-described range.

In addition, the recesses are preferably formed at a distribution density of 1 recess/$\mu m^2$ to 100 recesses/$\mu m^2$. As in the case of the maximum diameter of each recess, the recesses are preferably formed at the above-specified distribution density. As in the case of the maximum diameter of each recess, the above-specified distribution density of the recesses also allows adjustment of the electric resistance of the insulating fine particle layer and adjustment of the amount of electrons being emitted by the electron emitting element. Thus, the distribution density in the above-specified range provides an electron emitting element that can emit sufficient electrons at a moderate voltage.

Preferably, the insulating fine particle layer in the electron emitting element of the present invention is formed to have a thickness of 8 nm to 3000 nm. More preferably, the layer is formed to have a thickness of 30 nm to 1000 nm. The thickness in these ranges provides an electron emitting element including recesses smaller than the thickness of the insulating fine particle layer and the insulating fine particle layer having a uniform thickness. Since the thickness of the insulating fine particle layer is uniform, the electric resistance of the insulating fine particle layer will be uniform. As a result, it is possible to provide an electron emitting element that emits electrons uniformly throughout the element.

Preferably, the insulating fine particles in the electron emitting element of the present invention have an average particle diameter of 5 nm to 1000 nm. When the average particle diameter of the insulating fine particles is less than 5 nm, it is difficult to lessen variation of particle diameters, and therefore it is difficult to form a uniform insulating fine particle layer. On the other hand, when the average particle diameter of the insulating fine particles is more than 1000 nm, the insulating fine particles are precipitated to show poor dispersibility in the formation of the insulating fine particle layer by the application of the dispersion. Accordingly, the average particle diameter is preferably in the above-specified range.

In addition, the insulating fine particles may be particles formed of at least one insulator of $SiO_2$, $Al_2O_3$ and $TiO_2$. Since these insulators have high insulating properties, the electric resistance of the insulating fine particle layer can be adjusted to any range by adjusting the content of these insulators.

The second electrode in the electron emitting element of the present invention may be formed of at least one metal of gold, silver, tungsten, titanium, aluminum and palladium. Having a lower work function, these substances provide an electron emitting element that allows electrons having passed through the insulating fine particle layer to tunnel efficiently to emit more high-energy electrons from the second electrode.

Further, it is possible to provide a light emitting device that is stable, long-life and capable of performing planar light emission by using an electron emitting element of the present invention in the light emitting device or an image display device including the light emitting device.

Further, use of an electron emitting element of the present invention in an air blowing device or a cooling device enables high-efficiency cooling without experiencing electric discharge and generation of harmful substances such as ozone and NOx by utilizing slip effect on a surface of an object being cooled.

Further, use of an electron emitting element of the present invention in a charging device and an image forming apparatus including the charging device enables stable charging of an object for a longer time without experiencing electric discharge and generation of harmful substances such as ozone and NOx.

Further, use of an electron emitting element of the present invention in an electron-beam curing device enables area-by-area electron-beam curing and achievement of a maskless process, thereby achieving low cost and high throughput.

In addition, an electron emitting element of the present invention may be used in an electron emitting device. That is, the present invention may be directed to an electron emitting device comprising any one of the above-described electron emitting elements and a power supply for applying a voltage between the first electrode and the second electrode. Since an electron emitting element that can emit a sufficient amount of electrons by application of a moderate voltage and can continuously operate for a longer time is used, it is possible to provide an electron emitting device capable of stable electron emission.

These devices, that is, the light emitting device, the image display device, the air blowing device, the cooling device, the charging device, the image forming apparatus, the electron-beam curing device and the electron emitting device may include a plurality of electron emitting elements. For example, a plurality of electron emitting elements may be arranged on a planar body to be applied to these devices. In addition, a plurality of electron emitting elements may share a first electrode to be applied to these devices.

According to another aspect of the present invention, there is provided a method for producing an electron emitting element, the electron emitting element comprising: a first electrode; an insulating fine particle layer formed on the first electrode and composed of insulating fine particles; and a second electrode formed on the insulating fine particle layer and opposite the first electrode, wherein electrons provided from the first electrode are accelerated in the insulating fine particle layer to be emitted from the second electrode when a voltage is applied between the first electrode and the second electrode, the method comprising: a layer formation step of forming, on the first electrode, a layer containing insulating fine particles and organic fine particles and having a thickness larger than a size of the organic fine particles; an insulating fine particle layer formation step of forming the insulating fine particle layer by decomposing the organic fine particles in the layer formed on the first electrode to form recesses in a surface of the layer; and a step of forming the second electrode on the insulating fine particle layer and opposite the first electrode.

According to the aspect of the present invention, it is possible to produce an electron emitting element comprising an insulating fine particle layer provided with recesses on a surface thereof. Thus, there is provided a method for producing an electron emitting element that emits sufficient electrons at a moderate voltage.

The method for producing the electron emitting element of the present invention may further comprise the step of coating the recesses with a carbon thin film. Since the recesses are coated with the carbon thin film in the electron emitting element produced according to this method, it is possible to produce an electron emitting element that emits sufficient electrons at a moderate voltage, hardly causes dielectric breakdown and operates continuously for a longer time.

In addition, in the method for producing the electron emitting element of the present invention, the layer formation step may be a step of forming the layer by applying a dispersion containing the insulating fine particles and the organic fine particles dispersed therein onto the first electrode, and the insulating fine particle layer formation step may be a step of heat-treating the layer formed on the first electrode and thereby decomposing the organic fine particles to form the recesses in the surface of the layer. By heat-treating the layer formed on the first electrode and thereby thermally decomposing the organic fine particles, it is possible to form the recesses molded from the organic fine particles contained in the layer formed by the layer formation step. Thus, there is provided a method for readily producing an electron emitting element that emits sufficient electrons at a moderate voltage. In addition, by varying the size of the organic fine particles to use in the layer formation step, it is possible to readily produce an electron emitting element having any size of the recesses. That is, by varying the size of the organic fine particles, it is possible to vary the electric resistance of the recesses to locally adjust the magnitude of the electric fields. Thus, there is provided a production method that allows adjustment of the amount of electrons being emitted from the electron emitting element to an any range.

Further, the layer formation step may be a step of applying the dispersion containing the organic fine particles having an average particle diameter of 5 nm to 1000 nm dispersed therein onto the first electrode to form a layer having a thickness of 8 nm to 3000 nm. According to this embodiment, there is provided a method for producing an electron emitting element that emits electrons uniformly throughout the element.

Further, the layer formation step may be a step of applying the dispersion by a spin coating method, and the layer formation step may be a step of applying a dispersion obtained by dispersing the insulating fine particles and the organic fine particles in an aqueous solvent. Use of a spin coating method facilitates the application of the dispersion, and use of an aqueous solvent saves adverse impact on the environment. For example, use of water to prepare the dispersion is environmentally-friendly as avoiding use of an organic solvent.

Hereinafter, embodiments and examples of the present invention will be described with reference to FIG. 1 to FIG. 17. It should be noted that the following embodiments and examples are merely concrete examples of the present invention and the present invention is not limited to the following embodiments and examples.

Embodiment 1

FIG. 1 is a schematic view illustrating a configuration according to an embodiment of the electron emitting element of the present invention. As illustrated in FIG. 1, an electron emitting element 10 according to this embodiment comprises: an electrode substrate 1; an electron acceleration layer 3 formed on the electrode substrate 1 and composed of insulating fine particles; and a thin-film electrode 4 formed on the electron acceleration layer 3 and opposite the electrode substrate 1. When a voltage is applied between the electrode substrate 1 and the thin-film electrode 4, the electron emitting element 10 accelerates electrons provided from the electrode substrate 1 on the electron acceleration layer 3 to emit them from the thin-film electrode 4.

The electrode substrate 1 is an electrode serving as a substrate and composed of a plate-like material formed from a conductor. Specifically, it is composed of a plate-like material formed from a stainless used steel (SUS). Functioning as an electrode as well as a support of the electron emitting element, the electrode substrate 1 should have a certain level of strength and appropriate conductivity. Other than the stainless used steel (SUS), for example, a substrate formed from a metal such as SUS, Ti and Cu; and a substrates of a semiconductor such as Si, Ge and GaAs may be used.

Alternatively, the electrode substrate 1 may be a structure obtained by forming an electrode made of a metal film on an insulating substrate such as a glass substrate or a plastic substrate. When an insulating substrate such as a glass substrate is used, for example, an insulating substrate whose surface being the interface with the electron acceleration layer 3 is coated with a conductive material such as a metal may be used as the electrode substrate 1. Any kind of conductive material may be used for the electrode, as long as the conductive material can be formed by magnetron sputtering. When stable operation in the atmosphere is desired, however, conductive materials having higher antioxydation power are preferably used, and noble metals are more preferably used. ITO is also useful for the conductive material as being an electrically conductive oxide material which is widely used for a transparent electrode. Further, a plurality of conductive materials may be used to coat the insulating substrate in order to form a tough thin film. For example, a metallic thin film obtained by forming a Ti film having a thickness of 200 nm and further forming a Cu film having a thickness of 1000 nm on a surface of a glass substrate may be used as the electrode substrate 1. By coating a glass substrate with such a Ti thin film and a Cu thin film, a tough thin film can be formed. When a surface of the insulating substrate is coated with a conductive material, a pattern in a rectangle shape or the like may be formed by well-known photolithography or masking to form an electrode. While the conductive material and the thickness of the thin film are not particularly limited, the electrode substrate 1 should have good adhesiveness with structures including the electron acceleration layer to be formed thereon as described below.

The electron acceleration layer 3 is formed on the electrode substrate 1 as a layer covering the electrode and composed of the insulating fine particles 2. The electron acceleration layer 3 has a function of accelerating electrons provided from the electrode substrate 1 when a voltage is applied to the electrode substrate 1. Since it is preferable for the electron emitting element 10 to accelerate electrons by application of an intense electric field at a voltage as low as possible, the electron acceleration layer 3 should have a thickness as thin as possible. Specifically, the electron acceleration layer 3 preferably has a thickness of 8 nm to 3000 nm. Thereby, the thickness of the electron acceleration layer 3 can be formed uniformly and adjustment of the electric resistance in a direction of the layer thickness of the electron acceleration layer will be easy. More preferably, the electron acceleration layer 3 has a thickness of 30 nm to 1000 nm. Thereby, the thickness of the electron acceleration layer can be formed more uniformly and adjustment of the electric resistance in the direction of the layer thickness of the electron acceleration layer will be easier. As a result, electrons can be emitted uniformly over the entire surface of the electron emitting element, so that the electrons can be emitted from the thin-film electrode of the electron emitting element efficiently.

The insulating fine particles 2 are formed from an insulator. The material of the insulating fine particles 2 is not particularly limited as long as it has insulating properties. Practical examples of the material include insulators such as $SiO_2$, $Al_2O_3$ and $TiO_2$. More specifically, colloidal silica manufactured and sold by Nissan Chemical Industries, Ltd. may be used, for example. Here, two or more kinds of particles of different materials may be used for the insulating fine particle 2.

The insulating fine particles 2 are composed of fine particles, that is, mainly of nanosized particles. It is preferable to use particles having an average particle diameter of 5 nm to 1000 nm for the insulating fine particles 2. When the average particle diameter of the insulating fine particles is less than 5 nm, it is difficult to lessen variation of particle diameters, and therefore it is difficult to form a uniform insulating fine particle layer. On the other hand, when the average particle diameter of the insulating fine particles is more than 1000 nm, the insulating fine particles are precipitated to show poor dispersibility in the formation of the insulating electron acceleration layer by the application of the dispersion, causing the electron acceleration layer formed to have a nonuniform film thickness or causing reduction in mechanical strength. Accordingly, the insulating fine particles having an average particle diameter in the above-described range are preferably used.

When a plurality of kinds of particles of different materials are used, these particles should have an average particle diameter in the above-described range. The particles may be selected in view of their dispersibility when being dispersed in the dispersion and applied to form the electron acceleration layer 3.

Here, the action of the electron acceleration layer 3 composed of the insulating fine particles 2 will be described. The electron acceleration layer 3 is composed of the insulating fine particles 2 and show semiconductivity. When a voltage is applied to the electron acceleration layer 3, therefore, an extremely weak current will flow therethrough. The volt-ampere characteristic of the electron acceleration layer 3 shows a so-called varistor characteristic, and the current value sharply increases as the applied voltage increases. Some electrons in the current become ballistic electrons due to an intense electric field formed within the electron acceleration layer 3 by the applied voltage to be emitted to the outside of the electron emitting element 10 after being transmitted through the thin-film electrode 4 or passing through gaps in the thin-film electrode 4. A generation process of the ballistic electrons has not been determined, but it is considered that the ballistic electrons are generated by simultaneous acceleration and tunneling of electrons in a direction of an electric field. Here, if the insulating fine particles 2 are heat-treated to completely fuse and crystallize, the electron acceleration layer 3 will become an insulator, which will not function as the electron acceleration layer 3. Accordingly, it is insufficient for the electron acceleration layer 3 to be merely composed of the insulating fine particles 2 as a material; it is necessary for the electron acceleration layer 3 to be formed from the insulating fine particle 2 maintaining their particle shape.

The thin-film electrode 4 is formed on the electron acceleration layer 3 and opposite the electrode substrate 1. The thin-film electrode 4 is an electrode that forms a pair with the electrode substrate 1 and that, together with the electrode substrate 1, is used for applying a voltage to the inside of the electron acceleration layer 3. Accordingly, the material thereof should have conductivity to the extent that it can function as an electrode. In particular, a material which has a low work function and from which a thin-film can be formed is expected to provide a greater effect, because the thin-film electrode 4 is also an electrode that transmits and emits, with a minimum energy loss, electrons caused to have higher energy due to the acceleration within the electron acceleration layer 3. Examples of such a material include: gold, silver, tungsten, titanium, aluminum and palladium each of which has a work function in a range of 4 eV to 5 eV. Of these materials, in particular, in consideration of operation under an atmospheric pressure, gold is the best material, which is free from oxide or sulfide formation reaction. Further, silver, palladium and tungsten, each of which has a relatively small oxide formation reaction, are also applicable materials that can be used without any problem.

The film thickness of the thin-film electrode 4 is important as a condition for efficiently emitting electrons from the electron emitting element 10 to the outside of the element. It is therefore preferable that the film thickness of the thin-film electrode 4 is in a range of 10 nm to 55 nm. The minimum film thickness of the thin-film electrode 4 is 10 nm for causing the thin-film electrode 4 to function as a planar electrode. A film thickness of less than 10 nm cannot ensure electrical conduction. On the other hand, the maximum film thickness of the thin-film electrode 4 is 55 nm for emitting electrons from the electron emitting element 10 to the outside. When the film thickness is more than 55 nm, ballistic electrons do not pass thorough the thin-film electrode 4, and the ballistic electrons are absorbed by the thin-film electrode 4 or reflected back on the thin-film electrode 4 to be recaptured in the electron acceleration layer 3.

In FIG. 1, the thin-film electrode 4 is formed so as to substantially fill fine recesses 5 to be described below. However, the thin-film electrode 4 does not need to be formed so as to completely fill the fine recesses 5, as long as it covers the fine recesses 5. For example, the thin-film electrode 4 may be formed so that the shape of the fine recesses 5 appears on the surface of the thin-film electrode 4.

As illustrated in FIG. 1, the fine recesses are formed in the surface of the electron acceleration layer 3 on the side of the thin-film electrode so as to each have a depth smaller than the thickness of the electron acceleration layer 3. The plurality of fine recesses 5 are formed on the surface of the electron acceleration layer 3 so as to disperse uniformly all over the electron acceleration layer 3. It is supposed that the amount of electrons being emitted improves because the formation of the fine recesses 5 each having a depth smaller than the thickness of the electron acceleration layer 3 in the surface of electron acceleration layer 3 leads to formation of a locally intense electric field part needed for the electron emission. In order to achieve a structure in which the locally intense electric field part is formed, the fine recesses 5 each having a depth smaller than the thickness of the electron acceleration layer 3 are formed by using and decomposing organic fine particles in the formation of the electron acceleration layer 3 in the present embodiment.

The fine recesses 5 are formed into such a shape that the film thickness of the electron acceleration layer 3 gets gradually thinner as it gets closer to the center of each fine recess 5, that is, a crater-like shape (substantially hemispherically-recessed shape). In the present embodiment, it is supposed that the shape of the fine recesses 5 is dependent on the shape of the organic fine particles, because they are formed by decomposing the organic fine particles. It is preferable that the fine recesses 5 are in such a shape that the film thickness of the electron acceleration layer 3 gets gradually thinner in a direction of the depth of the fine recesses 5. For example, the fine recesses 5 may be in such a shape that each has an oval cross section or a substantially inverted parabolic cross section in addition to the substantially semicircular cross section. In addition, the planar shape (shape when seen from the upper surface of the electrode substrate) of the fine recesses 5 does not need to be substantially circular, and it may be rectangular, for example.

The maximum diameter of each fine recess 5 will also be dependent on the shape of the organic fine particles in the present embodiment. Since the electron emitting element emits sufficient electrons when the average particle diameter of the organic fine particles is 5 nm to 1000 nm, the maximum diameter of each recess is preferably 5 nm to 1000 nm. It is supposed that when the maximum diameter of each fine recess 5 is smaller than 5 nm, the electric resistance of the electron acceleration layer will not be small enough around the fine recesses 5 to discourage formation of locally intense electric fields. This problem is also caused when the fine recesses 5 are formed by using the organic fine particles and the pore diameter of the fine recesses 5 produced is smaller than 5 nm. Accordingly, the maximum diameter of each fine recess 5 is preferably 5 nm or more. On the other hand, it is supposed that when the maximum diameter of each fine recess 5 is larger than 1000 nm, the electric resistance of the electron acceleration layer will be small enough around the fine recesses 5 to increase the amount of the current flowing through the electron acceleration layer 3, but the current will leak more easily to cause the electric fields on the electron acceleration layer to weaken and discourage emission of electrons. Accordingly, the maximum diameter of each fine recess 5 is preferably 1000 nm or less.

The maximum diameter of each fine recess referred to means a maximum diameter of each recess on the plane of the surface of the electron acceleration layer (W in FIG. 1). When the fine recesses have a crater-like shape, therefore, the maximum one out of the pore diameters on the plane of the surface of the electron acceleration layer is the maximum diameter of each fine recess. Accordingly, when the fine recesses 5 have an oval crater-like shape, for example, the maximum diameter can be determined by measuring the width of the widest part of the oval as the pore diameter.

In addition, the fine recesses 5 are formed so as to have a depth smaller than the thickness of the electron acceleration layer 3. Although the depth of the fine recesses 5 is also dependent on the size of the organic fine particles in the present embodiment, the size of each particle of the organic fine particles does not need to be larger than the size of each particle of the insulating fine particles 2 that form the electron acceleration layer 3. The electron acceleration layer 3 is formed so as to have at least one or more particles of the insulating fine particles 2 in the layering direction. Considering the function as a layer, the electron acceleration layer 3 usually has two or three particles of the insulating fine particles 2 stacked in the layering direction. Accordingly, it is possible to form the fine recesses 5 each having a depth smaller than the thickness of the electron acceleration layer 3 by selecting particles, as the organic fine particles, each having a size smaller than a total size of two or three particles of the insulating fine particles 2. Since the thickness of the electron acceleration layer 3 is dependent on the number of particles of the insulating fine particles 2 stacked in the layering direction, it is possible to use organic fine particles each having a size larger than each particle of the insulating fine particles 2 to form the fine recesses 5, as long as the electron acceleration layer 3 is formed so as to have a sufficient thickness (here, the organic fine particles less than the insulating fine particles 2 should be dispersed so that the organic fine particles will not be stacked in the layering direction in the formation of the electron acceleration layer 3.)

Preferably, the fine recesses 5 are formed on the surface of the electron acceleration layer at a distribution density of 1 recess/µm² to 100 recesses/µm². As well as the pore diameter of the fine recesses, the number of the fine recesses also contributes to the adjustment of the electric resistance of the electron acceleration layer, and the most suitable number can be selected according to the pore diameter. When the pore diameter of the fine recesses is 80 nm, for example, the number of the fine recesses is preferably 3 recesses/µm² to 80 recesses/µm². The number of the fine recesses described above can be achieved by adjusting the amount of the organic fine particles being dispersed in a production method to be described concerning the present embodiment. The fine recesses 5 do not necessarily need to be arranged at regular intervals; it is sufficient that they are arranged to be dispersed to the extent that electric fields owing to the fine recesses 5 do not interfere with one another and the number of the fine recesses 5 arranged per unit area is in the above-specified numerical range.

In use of the electron emitting element, the electrode substrate 1 and the thin-film electrode 4 are connected to a power supply 7. As illustrated in FIG. 1, an electron emitting device may be configured to include the electron emitting element 10, and the power supply 7 connected to the electrode substrate 1 and the thin-film electrode 4.

Production Method

Next, a method for producing the electron emitting element 10 according to Embodiment 1 will be described.

First, a monodisperse dispersion of insulating fine particles obtained by dispersing insulating fine particles in water is prepared. The concentration of the insulating fine particles in the dispersion is preferably 10 wt % or more and 50 wt % or less. When the concentration is less than 10 wt %, the surface of the electrode substrate cannot be filled with the insulating fine particles. On the other hand, when the concentration is more than 50 wt %, the viscosity of the dispersion increases to cause aggregation, preventing formation of a thin film. Example of the monodisperse dispersion of insulating fine particles include colloidal silica MP-4540 (average particle diameter: 450 nm, 40 wt %), MP-3040 (average particle diameter: 300 nm, 40 wt %), MP-1040 (average particle diameter: 100 nm, 40 wt %), SNOWTEX-20 (average particle diameter: 15 nm, 20 wt %) and SNOWTEX-SX (average particle diameter: 5 nm, 20 wt %) manufactured by Nissan Chemical Industries, Ltd., which are dispersions of hydrophilic silica.

Next, a monodisperse dispersion of organic fine particles obtained by dispersing organic fine particles in water is prepared. The concentration of the organic fine particles in the dispersion is preferably 10 wt % or more and 50 wt % or less. When the concentration is less than 10 wt %, the surface of the electrode substrate cannot be filled with the insulating fine particles. On the other hand, when the concentration is more than 50 wt %, the viscosity of the dispersion increases to cause aggregation, preventing formation of a thin film. The organic fine particles having an average particle diameter of 5 nm to 1000 nm are used. The shape of the organic fine particles is not particularly limited, and true sphere-like particles and ellipsoidal particles are suitably used, for example. In addition, columnar particles may be used. Out of the organic fine particles having such shapes, organic fine particles having an appropriate particle diameter and an appropriate shape according to the thickness of the electron acceleration layer 3 in the electron emitting element to produce may be selected (they may be selected from commercially available products). Organic materials such as acrylic resins and styrene resins, which are thermally decomposed at a temperature lower than the decomposition temperature of the above-described insulating fine particles are used. Examples of the organic fine particles include Finesphere series FS-101 (average particle diameter: 80 nm, 20 wt %), FS-102 (average particle diameter: 80 nm, 20 wt %) and MG-151 (average particle diameter: 70 nm, 20 wt %) manufactured by Nippon Paint Co., Ltd., which are acrylic fine particles or styrene acrylic fine particles; EPOSTAR MX series manufactured by Nippon Shokubai Co., Ltd., which is resin spherical fine particles made of cross-linked methyl methacrylate; and cross-linked fine particles (SX 8743) made of stylene/divinylbenzene and polystyrene latex particles STADEX articles series manufactured by JSR Corporation.

Next, the dispersion of the insulating fine particles and the dispersion of the organic fine particles are mixed to prepare a dispersion in which the insulating fine particles and the organic fine particles are mixed and dispersed. The dispersion of the insulating fine particles and the dispersion of the organic fine particles are mixed at a ratio that gives a desired concentration and stirred to prevent aggregation of the insulating fine particles and the organic fine particles. The dispersion in which the insulating fine particles and the organic fine particles are mixed and dispersed may be prepared by adding and dispersing a powder of the organic fine particles in the dispersion of the insulating fine particles.

Next, the dispersion prepared is applied onto the electrode substrate by a spin coating method to form a fine particle layer (layer containing the insulating fine particles and the organic fine particles). When the electrode substrate is formed from aluminum or a stainless steel and the surface of the electrode substrate is hydrophobic, for example, the dispersion of hydrophilic silica will be repelled, and therefore the surface of the electrode substrate is subjected to a hydrophilic treatment. The hydrophilic treatment is not particularly limited, and in the case of a UV treatment, for example, the surface of the electrode substrate is irradiated with UV under vacuum of 20 Pa for 10 minutes. The condition for the spin coating of the dispersion is not particularly limited; for example, after the dispersion prepared is applied onto the electrode substrate, the electrode substrate is spun at a spin speed of 500 rpm for five seconds, and then the electrode substrate is spun at a spin speed of 3000 rpm to 4500 rpm for 10 seconds. The amount of the dispersion being applied onto the electrode substrate is not particularly limited; for example, it is 0.2 mL/cm$^2$ or more when applied to a 24-millimeter-square electrode substrate. Use of the spin coating method enables very simple and easy, and widespread application of the insulating fine particles and the organic fine particles. The method can therefore be suitably used for a device required to emit electrons over a wider area.

After the application by the spin coating method, the electrode substrate on which the dispersion has been applied is dried. The application and the drying may be repeated until the layer formed of the applied dispersion reaches a desired film thickness.

Next, the electrode substrate after the application is heat-treated to thermally decompose the organic fine particles in the fine particle layer (layer containing the insulating fine particles and the organic fine particles) formed on the electrode substrate thereby to form the fine recesses in a surface of the fine particle layer. That is, by thermally decomposing the organic fine particles, the fine recesses molded from the organic fine particles are produced.

Preferably, the heat treatment is performed at a temperature equal to or higher than the decomposition temperature of the organic fine particles, or within a temperature range where the inorganic fine particles do not crystallize. When the fine inorganic particles fuse and crystallize, the fine particle layer will become a complete insulator and will not function as the electron acceleration layer. For example, the heat treatment is preferably performed at 400° C. for 5 minutes, when $SiO_2$ is used as the material of the inorganic fine particles and acrylic is used as the material of the organic fine particles. As a result of the heat treatment, the fine recesses are formed in the surface of the electron acceleration layer 3, whereupon the formation of the electron acceleration layer 3 is completed.

The heat treatment as described above enables improvement in the mechanical strength of the electron emitting element and stable provision of electrons by the electron emitting element. Without the heat treatment, the electron emitting element will have insufficient mechanical strength and will be fragile and breakable even with the thin-film electrode 4 provided on the electron acceleration layer 3, leading to unstable electron emission. The heat treatment as described above is therefore performed.

Next, the thin-film electrode 4 is formed on the electron acceleration layer 3 formed. For forming the thin-film electrode 4, a magnetron sputtering method may be used, for example. The thin-film electrode 4 my formed by an inkjet method, a spin coating method or a vapor deposition method, for example.

Embodiment 2

Figure 2:
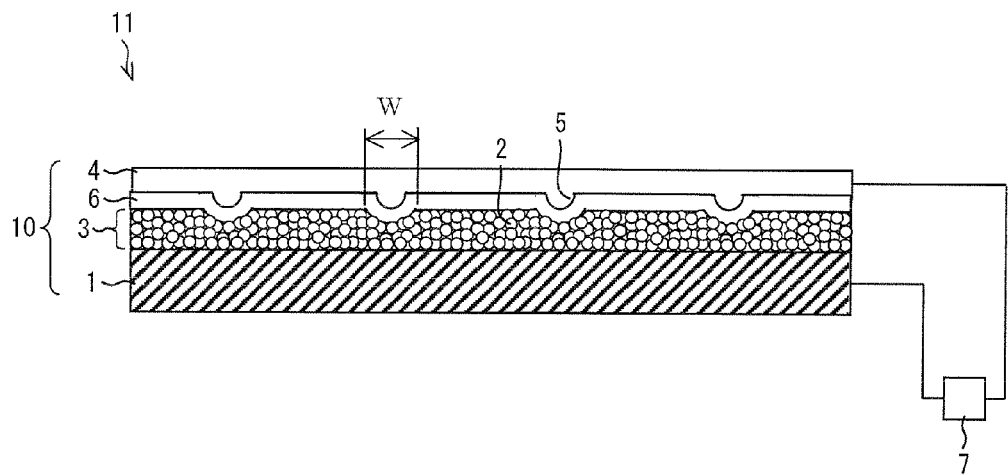
FIG. 2 is a schematic view illustrating a configuration of an electron emitting element according to another embodiment of the present invention.

FIG. 2 is a schematic view illustrating a configuration according to another embodiment of the electron emitting element of the present invention. As illustrated in FIG. 2, the electron emitting element 10 according to the present embodiment is provided with a carbon thin film 6 in addition to the configuration of Embodiment 1. That is, the fine recesses 5 are coated with the carbon thin film 6. The carbon thin film 6 is formed on the electron acceleration layer 3 so as to uniformly cover the fine recesses 5, and the thin-film electrode 4 is formed on the carbon thin film 6.

It is supposed that the carbon thin film 6 functions as an appropriate resistor. Having a higher electric resistance than the thin-film electrode 4, the carbon thin film 6 relieves continuous current/voltage stress applied from the thin-film electrode to the electron acceleration layer. Thus, provision of the carbon thin film 6 between the thin-film electrode 4 and the electron acceleration layer 3 enhances the life performance (lifetime of the element).

The thickness of the carbon thin film 6 is preferably 5 nm to 20 nm. The film thickness of less than 5 nm is insufficient for the carbon thin film to function as a resistor, and the film thickness of more than 20 nm may prevent a voltage necessary for electron emission to be applied sufficiently.

Figure 3:
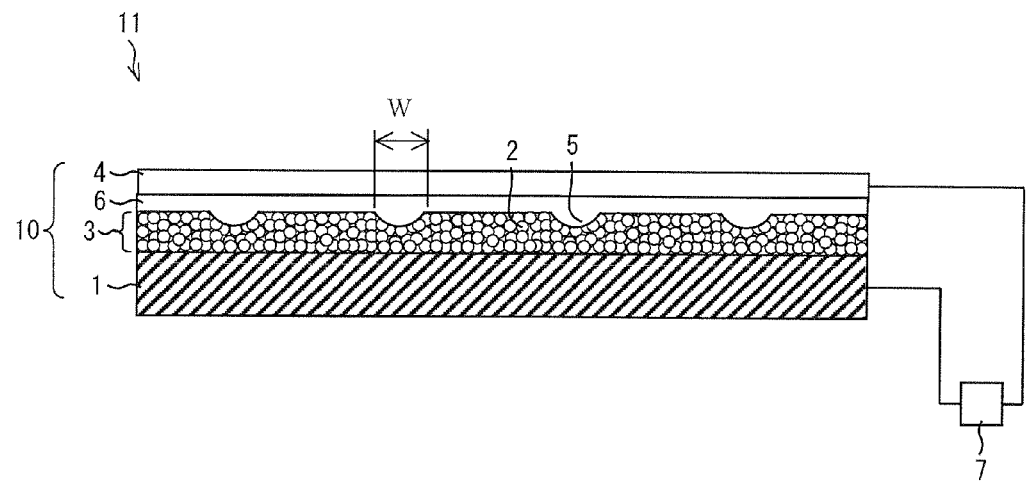
FIG. 3 is a schematic view illustrating a modification of a carbon thin film according to the embodiment of the present invention illustrated in FIG. 2.
Figure 4:
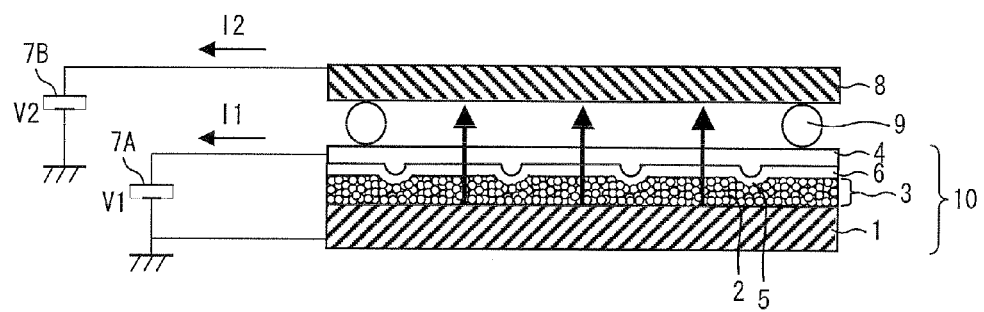
FIG. 4 is a drawing illustrating a measurement system for an electron emission experiment.

In addition, as illustrated in FIG. 3, the carbon thin film 6 may be formed on the electron acceleration layer 3 so as to coat the fine recesses 5 and have a flat surface above the fine recesses 5. In order to function as a resistor, the carbon thin film 6 only needs to be formed so as to cover the fine recesses 5, but when the fine recesses 5 are very small (having a maximum size of several nm, for example) and the carbon thin film 6 is formed thick (having a film thickness of 20 nm, for example), the surface of the carbon thin film 6 above the fine recesses 5 will be flat. Even in such a case, the electron emitting element emits sufficient electrons, as long as the electric fields formed on the electron acceleration layer 3 are intensified by the fine recesses 5. The carbon thin film 6 may be therefore formed so as to have a flat surface above the fine recesses 5. Preferably, the carbon thin film 6 has a film thickness in the above-specified range even where it is on the fine recesses 5. Preferably, the carbon thin film 6 has a film thickness where it is around the fine recesses 5 substantially the same as a film thickness where it is off the fine recesses 5. As in the case of the carbon thin film 6, the thin-film electrode 4 may be formed so as to have a flat surface above the fine recesses 5.

Production Method

Next, a method for producing the electron emitting element 10 according to Embodiment 2 will be described. Since the method for producing the electron emitting element 10 according to Embodiment 2 is different in the steps following the formation of the electron acceleration layer 3, the steps following the formation of the electron acceleration layer 3 will be described.

After the fine recesses are formed in the surface of the electron acceleration layer 3 to complete the formation of the electron acceleration layer 3, the carbon thin film 6 is formed on the electron acceleration layer 3 formed. The carbon thin film 6 may be formed by a vapor deposition method, for example. Alternatively, it may be formed by a magnetron sputtering method. After the formation of the carbon thin film 6, the thin-film electrode 4 is formed on the carbon thin film 6.

EXAMPLES

In the following examples, will be described an experiment to measure electron emitting elements of the present invention for the current. This experiment is merely an example of embodiments and by no means limits the present invention.

First, an electron emitting element of Example 1 and an electron emitting element of Comparative Example 1 were produced as described below. Then, the electron emitting elements produced were measured for the electron emission current per unit area by using an experiment system illustrated in FIG. 4. In the experiment system in FIG. 4, a counter electrode 8 was disposed on a side of the thin-film electrode 4 of the electron emitting element 10 so that the counter electrode 8 and the thin-film electrode 4 had an insulating spacer 9 therebetween. The electron emitting element 10 and the counter electrode 8 were connected to the power supplies 7, respectively so that a voltage V1 was applied to the electron emitting element 10 and a voltage V2 was applied to the counter electrode 8. The experiment system was set up in vacuum at $1\times10^{-8}$ ATM and an electron emission experiment was carried out. The distance between the electron emitting element and the counter electrode, having the insulating spacer 9 therebetween, was 5 mm in the experiment. The voltage V2 applied to the counter electrode was 50 V.

Example 1

A 24 mm×24 mm SUS substrate was used as an electrode substrate 1 and irradiated with UV under vacuum of 20 Pa for 10 minutes.

First, colloidal silica manufactured by Nissan Chemical Industries, Ltd., SNOWTEX-XS (nominal average particle diameter: 5 nm, 20 wt % according to the manufacturer) as insulating fine particles 2 was diluted in 10 wt % of ultrapure water, and 5.7 g of the colloidal silica solution and 0.5 g of acrylic fine particles manufactured by Nippon Paint Co., Ltd., FS-101E (nominal average particle diameter: 80 nm, 20 wt % according to the manufacturer) as organic fine particles were mixed and applied to an ultrasonic disperser to prepare a dispersion of the fine particles.

Onto the 24 mm×24 mm SUS substrate to be the electrode substrate 1, 1 mL of the dispersion obtained as described above was dropped, and then a fine particle layer containing the insulating fine particles and the organic fine particles was formed by a spin coating method in two stages of spinning at 500 rpm for 5 seconds and then spinning at 3000 rpm for 10 seconds, and left to naturally dry at room temperature. Thereafter, the electrode substrate on which the fine particle layer was formed was heated at 400° C. for 5 minutes with an electric furnace. The thickness of an electron acceleration layer 3 prepared as described above was 0.2 μm.

Then, a thin-film electrode 4 was formed on a surface of the electron acceleration layer 3 with a magnetron sputtering apparatus to obtain the electron emitting element of Example 1. Gold was used as the material of the film formed as the thin-film electrode 4, the thickness of the thin-film electrode 4 was 40 nm, and the area of the thin-film electrode 4 was 0.01 $cm^2$.

Figure 13:
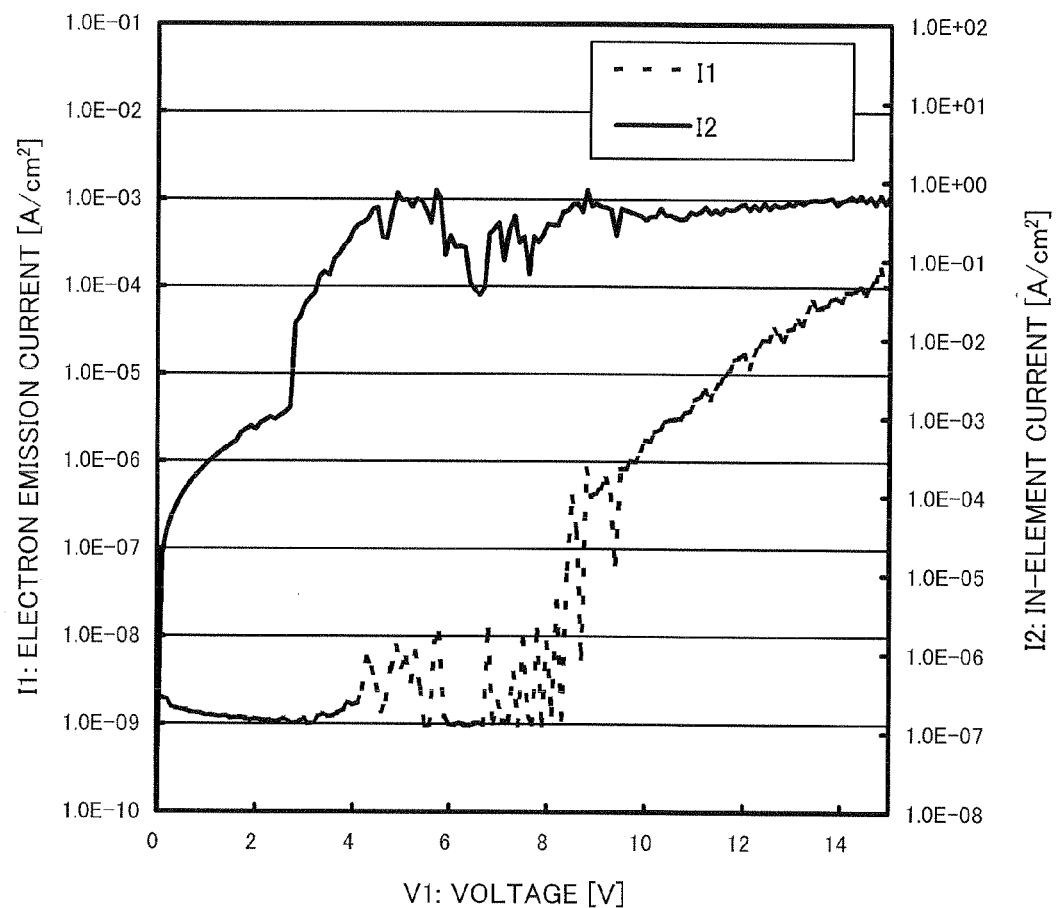
FIG. 13 is a drawing illustrating a result (VI characteristics) of Example 1 of the present invention measured for the electron emission current and the in-element current.

FIG. 13 shows measurement result of the electron emission experiment with the electron emitting element of Example 1 in vacuum at $1\times10^{-8}$ ATM. FIG. 13 is a graph showing variation of the electron emission current and the in-element current as the voltage V1 applied to the thin-film electrode 4 was varied. It was confirmed that the electron emitting element of Example 1 showed an electron emission current per unit area of $1.7\times10^{-4}$ $A/cm^2$ in vacuum at $1\times10^{-8}$ ATM when the voltage V1 applied to the thin-film electrode 4 was 15 V.

Figure 14:
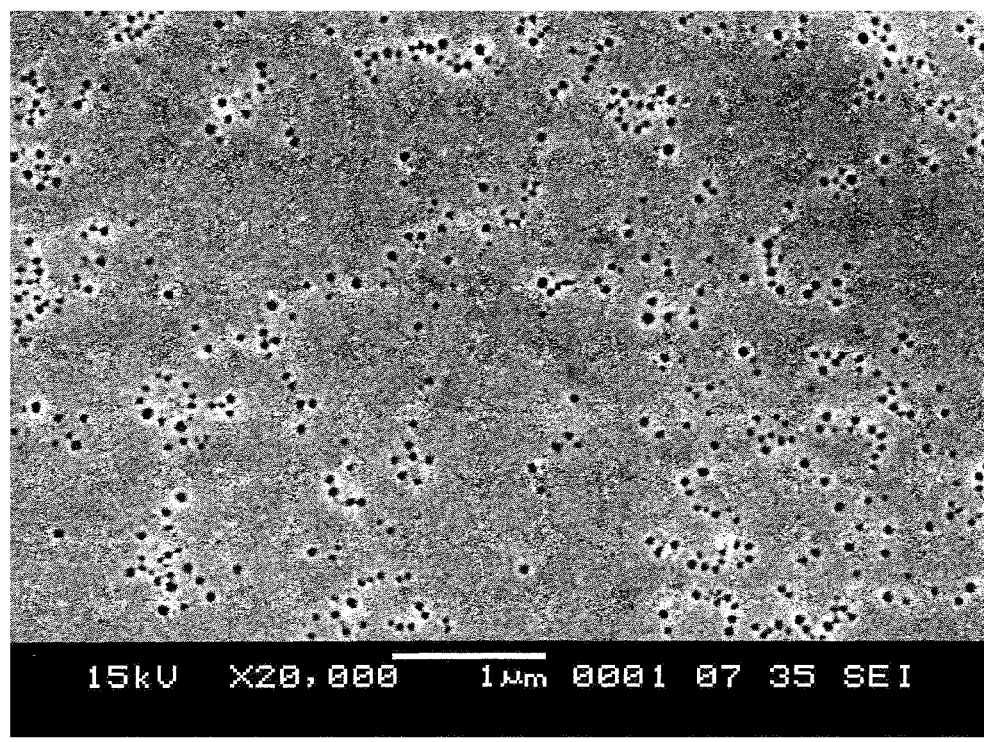
FIG. 14 is an SEM image observing a surface of an electron acceleration layer in Example 1 of the present invention.

FIG. 14 shows an SEM image observing the surface of the electron acceleration layer of Example 1. The SEM image is an image of the surface of the electron acceleration layer of Example 1. It was confirmed that fine recesses opening on the surface of the electron acceleration layer were formed by the above-described production method. In addition, cross-section observation was performed with an STEM to confirm that hemispherical fine recesses having an aperture of 70 nm and a depth of 30 nm were formed in the surface of the electron acceleration layer. Since the size of the recesses is substantially the same as the size of the acrylic fine particles, it was found that the fine recesses were molded from the acrylic fine particles decomposed.

Example 2

A 24 mm×24 mm SUS substrate was used as an electrode substrate 1 and irradiated with UV under vacuum of 20 Pa for 10 minutes.

First, colloidal silica manufactured by Nissan Chemical Industries, Ltd., SNOWTEX-XS (nominal average particle diameter: 5 nm, 20 wt % according to the manufacturer) as insulating fine particles 2 was diluted in 10 wt % of ultrapure water, and 5.7 g of the colloidal silica solution and 0.5 g of acrylic fine particles manufactured by Nippon Paint Co., Ltd., FS-101E (nominal average particle diameter: 80 nm, 20 wt % according to the manufacturer) as organic fine particles were mixed and applied to an ultrasonic disperser to prepare a dispersion of the fine particles.

Onto the 24 mm×24 mm SUS substrate to be the electrode substrate 1, 1 mL of the dispersion obtained as described above was dropped, and then a fine particle layer containing the insulating fine particles and the organic fine particles was formed by a spin coating method in two stages of spinning at 500 rpm for 5 seconds and then spinning at 3000 rpm for 10 seconds, and left to naturally dry at room temperature. Thereafter, the electrode substrate on which the fine particle layer was formed was heated at 400° C. for 5 minutes with an electric furnace. The thickness of an electron acceleration layer 3 prepared as described above was 0.2 μm.

A carbon thin film was formed on a surface of the electron acceleration layer 3 with a vapor deposition apparatus, and a thin-film electrode 4 was further formed on a surface of the carbon thin film with a magnetron sputtering apparatus to obtain an electron emitting element of Example 2. Gold was used as the material of the film formed as the thin-film electrode 4, the thickness of the thin-film electrode 4 was 40 nm, and the area of the thin-film electrode 4 was 0.01 cm$^2$.

Figure 15:
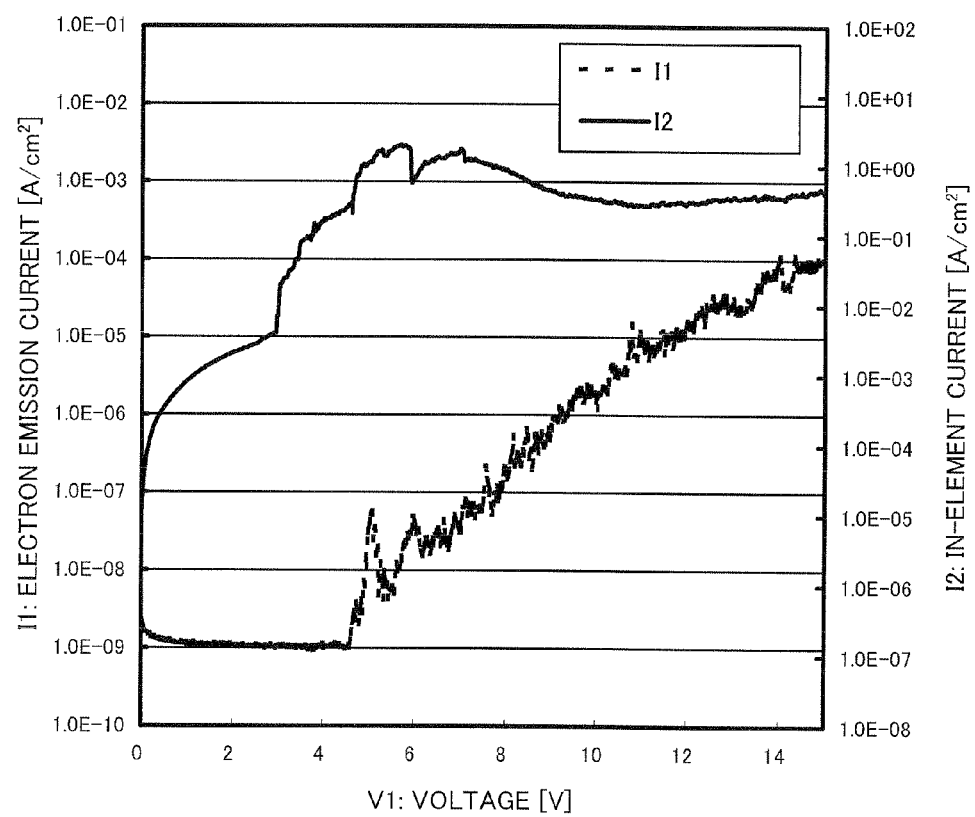
FIG. 15 is a drawing illustrating a result (VI characteristics) of Example 2 of the present invention measured for the electron emission current and the in-element current.

FIG. 15 shows measurement result of the electron emission experiment with the electron emitting element of Example 2 in vacuum at $1\times10^{-8}$ ATM. FIG. 15 is a graph showing variation of the electron emission current and the in-element current as the voltage V1 applied to the thin-film electrode 4 was varied. It was confirmed that the electron emitting element of Example 2 showed an electron emission current per unit area of $9.9\times10^{-5}$ A/cm$^2$ in vacuum at $1\times10^{-8}$ ATM when the voltage V1 applied to the thin-film electrode 4 was 15V.

Figure 16:
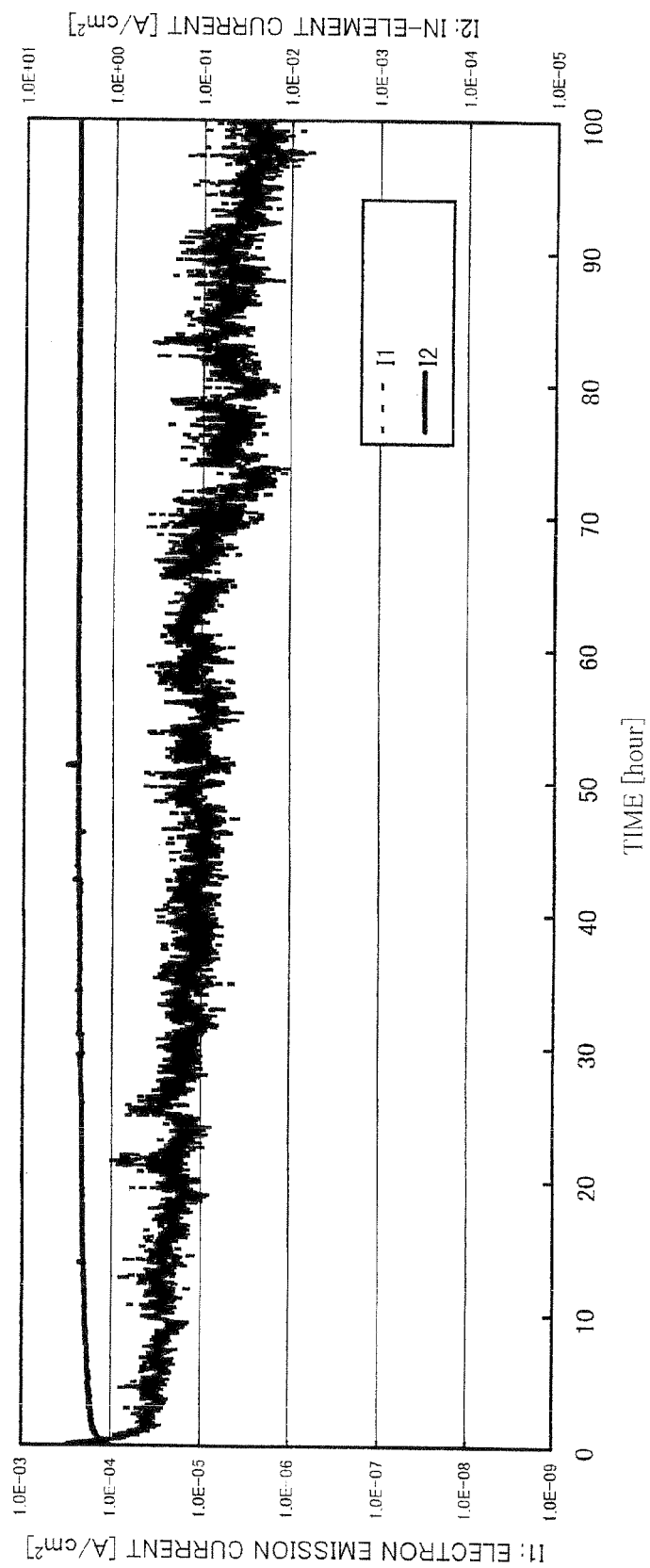
FIG. 16 is a drawing illustrating a result of an aging test performed on Example 2 of the present invention in vacuum.

FIG. 16 shows result of aging of the electron emitting element of Example 2 performed in vacuum at $1\times10^{-8}$ ATM. It was confirmed that the electron emitting element of Example 2 showed an electron emission current per unit area of $2.0\times10^{-6}$ A/cm$^2$ in vacuum at $1\times10^{8}$ ATM after continuous operation at the applied voltage V1=17 V for 100 hours.

Example 3

A 24 mm×24 mm aluminum substrate was used as an electrode substrate 1 and irradiated with UV under vacuum of 20 Pa for 10 minutes.

First, 5.4 g of colloidal silica manufactured by Nissan Chemical Industries, Ltd., MP1040 (nominal average particle diameter: 100 nm, 40 wt % according to the manufacturer) as insulating fine particles 2 and 0.5 g of acrylic fine particles manufactured by Nippon Paint Co., Ltd., FS-101E (nominal average particle diameter: 80 nm, 20 wt % according to the manufacturer) as organic fine particles were mixed and applied to an ultrasonic disperser to prepare a dispersion of the fine particles.

Onto the 24 mm×24 mm aluminum substrate to be the electrode substrate 1, 1 mL of the dispersion obtained as described above was dropped, and then a fine particle layer containing the insulating fine particles and the organic fine particles was formed by a spin coating method in two stages of spinning at 500 rpm for 5 seconds and then spinning at 3000 rpm for 10 seconds, and left to naturally dry at room temperature. Thereafter, the electrode substrate on which the fine particle layer was formed was heated at 400° C. for 5 minutes with an electric furnace. The thickness of an electron acceleration layer 3 prepared as described above was 0.9 μm.

A thin-film electrode 4 was formed on a surface of the electron acceleration layer 3 with a magnetron sputtering apparatus to obtain an electron emitting element of Example 3. Gold was used as the material of the film formed as the thin-film electrode 4, the thickness of the thin-film electrode 4 was 40 nm, and the area of the thin-film electrode 4 was 0.01 cm$^2$.

Figure 17:
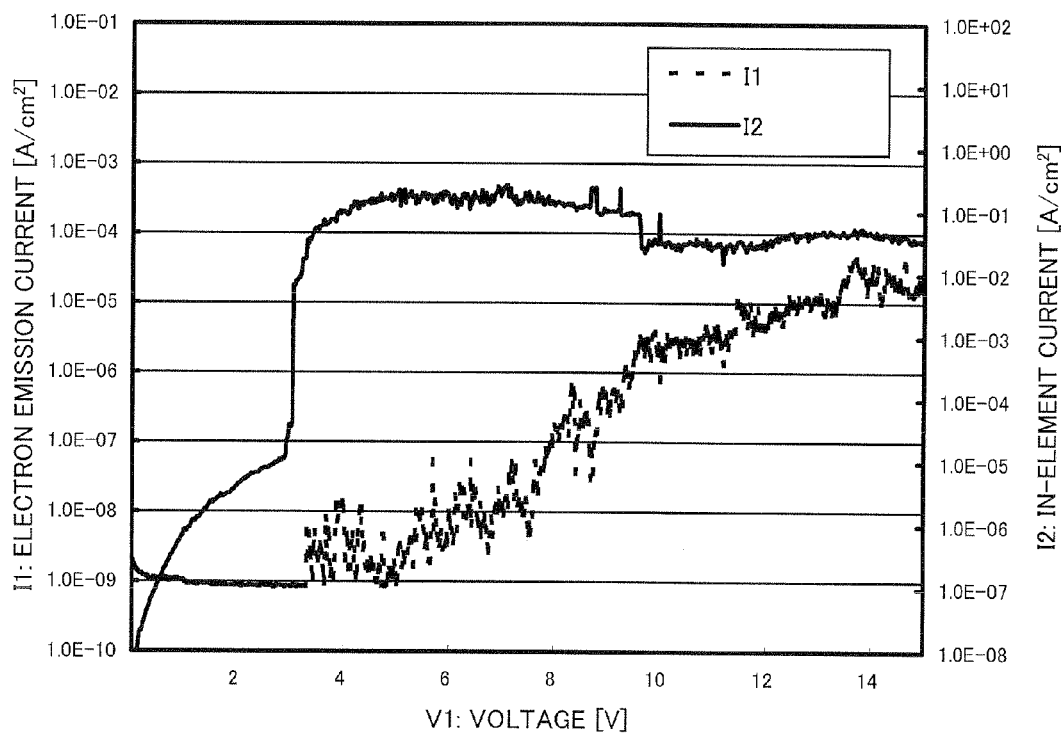
FIG. 17 is a drawing illustrating a result (VI characteristics) of Example 3 of the present invention measured for the electron emission current and the in-element current.

FIG. 17 shows measurement result of the electron emission experiment with the electron emitting element of Example 3 in vacuum at $1\times10^{-8}$ ATM. FIG. 17 is a graph showing variation of the electron emission current and the in-element current as the voltage V1 applied to the thin-film electrode 4 was varied. It was confirmed that the electron emitting element of Example 3 showed an electron emission current per unit area of $1.5\times10^{-5}$ A/cm$^2$ in vacuum at $1\times10^{-8}$ ATM when the voltage V1 applied to the thin-film electrode 4 was 15 V.

Figure 18:
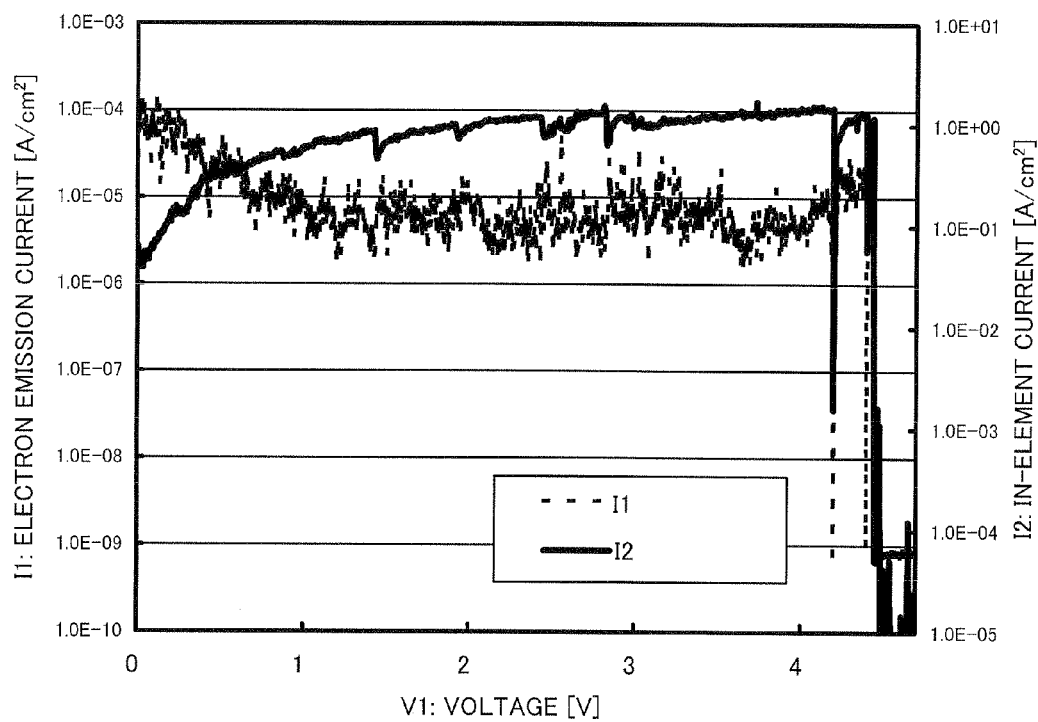
FIG. 18 is a drawing illustrating a result of an aging test performed on Example 3 of the present invention in vacuum.

FIG. 18 shows result of aging of the electron emitting element of Example 3 performed in vacuum at $1\times10^{-8}$ ATM. It was confirmed that the electron emitting element of Example 3 showed an electron emission current per unit area of $1.6\times10^{-5}$ A/cm$^2$ in vacuum at $1\times10^{-8}$ ATM after continuous operation at the applied voltage V1=15 V for 4 hours, and then the current suddenly dropped to $8.4\times10^{-10}$ A/cm$^2$ and the electron emission stopped.

Comparative Example 1

A 24 mm×24 mm SUS substrate was used as an electrode substrate 1 and irradiated with UV under vacuum of 20 Pa for 10 minutes.

First, colloidal silica manufactured by Nissan Chemical Industries, Ltd., SNOWTEX-XS (nominal average particle diameter: 5 nm, 20 wt % according to the manufacturer) as insulating fine particles 2 was diluted in 10 wt % of ultrapure water and applied to an ultrasonic disperser to prepare a dispersion of the fine particles.

Onto the 24 mm×24 mm SUS substrate to be the electrode substrate 1, 1 mL of the dispersion obtained as described above was dropped, and then an electron acceleration layer 3 containing the insulating fine particles was formed by a spin coating method in two stages of spinning at 500 rpm for 5 seconds and then spinning at 3000 rpm for 10 seconds, and left to naturally dry at room temperature. The thickness of the electron acceleration layer 3 prepared as described above was 0.8 μm.

Then, a thin-film electrode 4 was formed on a surface of the electron acceleration layer 3 with a magnetron sputtering apparatus to obtain an electron emitting element of Comparative Example 1. Gold was used as the material of the film formed as the thin-film electrode 4, the thickness of the thin-film electrode 4 was 40 nm, and the area of the thin-film electrode 4 was 0.01 cm$^2$.

Figure 19:
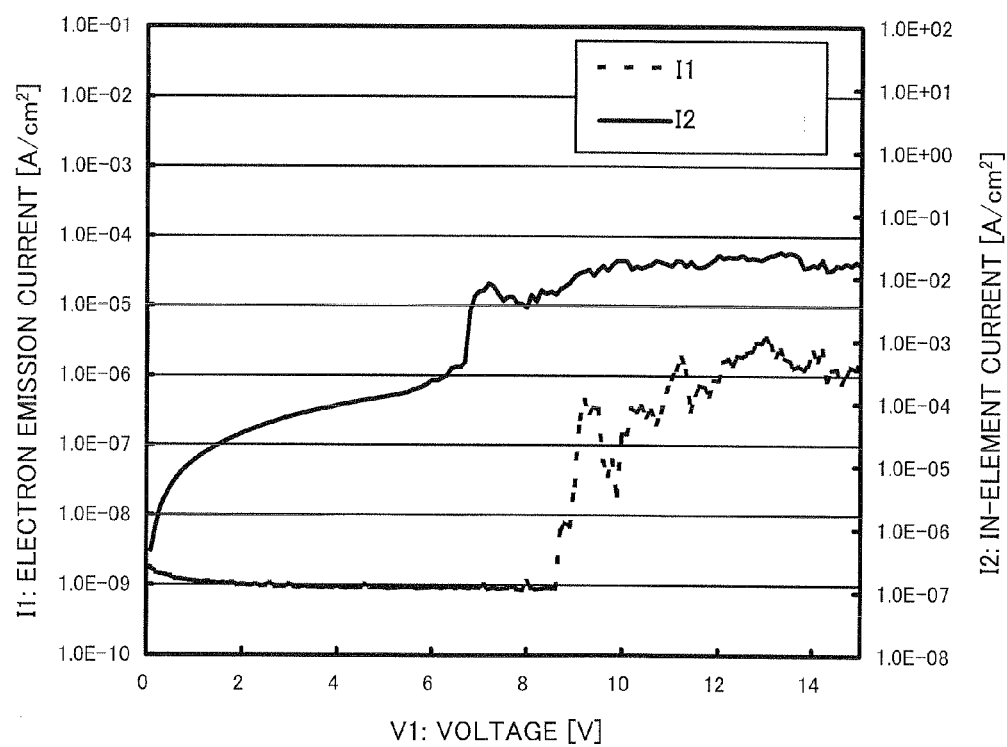
FIG. 19 is a drawing illustrating a result (VI characteristics) of Comparative Example 2 of the present invention measured for the electron emission current and the in-element current.

FIG. 19 shows measurement result of the electron emission experiment with the electron emitting element of Comparative Example 1 in vacuum at $1\times10^{-8}$ ATM. FIG. 19 is a graph showing variation of the electron emission current and the in-element current as the voltage V1 applied to the thin-film electrode 4 was varied. It was confirmed that the electron emitting element of Comparative Example 1 showed an electron emission current per unit area of $2.0 \times 10^{-6}$ A/cm$^2$ in vacuum at $1 \times 10^{-8}$ ATM when the voltage V1 applied to the thin-film electrode 4 was 15 V. The surface of the electron acceleration layer of the electron emitting element of Comparative Example 1 was observed with an SEM to find that the fine recesses observed in Examples 1 to 3 were not formed in Comparative Example 1.

The electron emission current of Example 1 increased to be $1.7 \times 10^{-4}$ A/cm$^2$, which is approximately 100 times the electron emission current of Comparative Example 1 of $2.0 \times 10^{-6}$ A/cm$^2$. This result has revealed that the amount of electrons being emitted is improved by providing the fine recesses opening on the surface of the electron acceleration layer of the electron emitting element.

In addition, while the electron emitting element of Example 3 stopped emitting electrons at the time when the operation had been continued for 4 hours, the electron emitting element of Example 2 kept emitting electrons even at the time when the operation had been continued for 100 hours. The result has revealed that the life performance is improved by providing the carbon thin film between the thin-film electrode and the electron acceleration layer composed of an insulating material of the electron emitting element.

Embodiment 3

Figure 5:
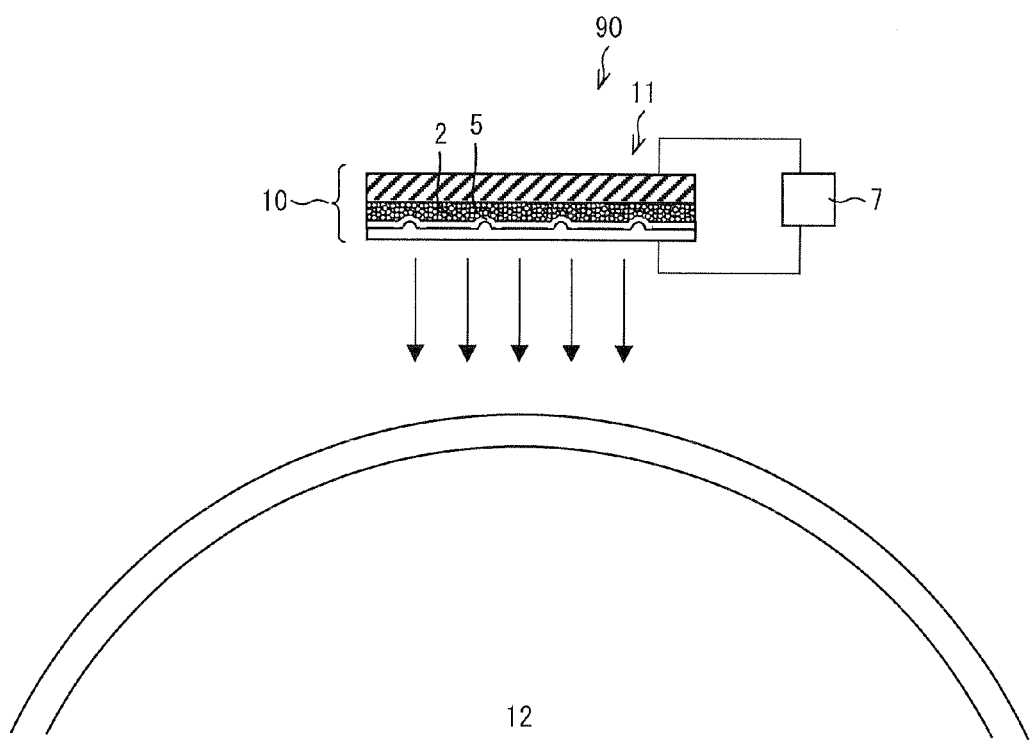
FIG. 5 is a drawing illustrating an example of a charging device including an electron emitting element of the present invention.

FIG. 5 illustrates an example of a charging device 90 including the electron emitting element 10 described in Embodiment 2. The charging device 90 comprises an electron emitting device 11 having the electron emitting element 10 and the power supply 7 for applying a voltage to the electron emitting element 10. The charging device 90 is used for electrically charging a photoreceptor 12. The charging device 90 is used for an image forming apparatus, for example. That is, an image forming apparatus according to an embodiment includes the charging device 90. In the image forming apparatus according to this embodiment, the electron emitting element 10 constituting the charging device 90 is disposed so as to face the photoreceptor 12 being charged. Application of a voltage causes emission of electrons so that the photoreceptor 12 is electrically charged. In the image forming apparatus according to the present embodiment, other than the charging device 90, conventionally known constituents may be used. The electron emitting element 10 which is used as the charging device 90 is preferably disposed so as to be, for example, 3 mm to 5 mm apart from the photoreceptor 12. Further, it is preferable that a voltage of approximately 25 V is applied to the electron emitting element 10. The electron acceleration layer of the electron emitting element 10 should be configured such that 1 μA/cm$^2$ of electrons are emitted per unit time in response to application of a voltage of 25V, for example.

Even when the electron emitting device 11 which is used as the charging device 90 operates in the atmosphere, electric discharge does not occur. The charging device 90 therefore generates no ozone. Ozone is harmful to human bodies, and therefore regulated in various environmental standards. Even if ozone is not discharged to the outside of the apparatus, ozone oxidizes and deteriorates an organic material such as the photoreceptor 12 or a belt in the apparatus. Such a problem can be solved by using the electron emitting device 11 according an embodiment of the present invention for the charging device 90 and further including such a charging device 90 in the image forming apparatus. In addition, since the electron emitting element 10 is improved in the amount of electrons being emitted, the charging device 90 can perform the charging efficiently.

When an electron emitting device 11 having a plurality of electron emitting elements according to an embodiment of the present invention formed on a substrate is used, the electron emitting device 11 which is used as the charging device 90 is configured as a planar electron source. The electron emitting device 11 is therefore capable of charging the photoreceptor 12 on an area that has a width in a rotation direction. This provides many chances for charging a section of the photoreceptor 12. Therefore, the charging device 90 can perform more uniform electric charging as compared to a wire charging device, which performs electric charging line by line. Further, the charging device 90 has an advantage such that the voltage being applied is approximately 10 V, which is far lower than that of a corona discharge device, which requires a voltage of several kV be applied.

Embodiment 4

Figure 6:
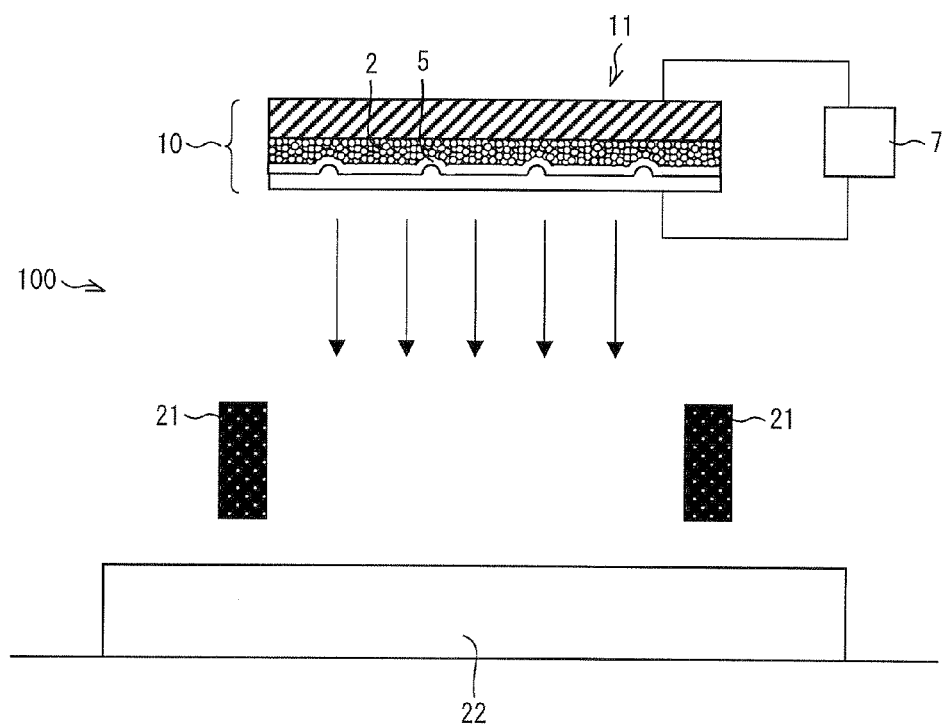
FIG. 6 is a drawing illustrating an example of an electron-beam curing device including an electron emitting element of the present invention.

FIG. 6 illustrates an example of an electron-beam curing device 100 including the electron emitting element 10 described in Embodiment 2. The electron-beam curing device 100 comprises an electron emitting device 11 having the electron emitting element 10 and the power supply 7 for applying a voltage to the electron emitting element 10, and an accelerating electrode 21 for accelerating electrons. In the electron-beam curing device 100, the electron emitting element 10 serving as an electron source emits electrons, and the electrons emitted are accelerated by the accelerating electrode 21 so that the electrons collide with a resist 22 (object being cured). Energy necessary for curing the general resist 22 is not more than 10 eV. In terms of energy, therefore, the accelerating electrode is not necessary. However, in order to entirely cure the resist 22 having a thickness of 1 μm, for example, an accelerating voltage of approximately 5 kV is required, because a penetration depth of an electron beam is determined by a function of energy of electrons.

In a conventional general electron-beam curing device, an electron source is sealed in vacuum and caused to emit electrons by application of a higher voltage (50 kV to 100 kV). The electrons are taken out through an electron window and used for irradiation. According to this electron emission method, loss of a large amount of energy occurs in the electrons when the electrons pass through the electron window. Further, the electrons that have reached the resist also pass through the resist in the thickness direction, because the electrons have high energy. This leads to decrease in energy utilization efficiency. In addition, since an area on which electrons are thrown at a time is small and irradiation is performed in a manner drawing with dots, throughput is low.

On the other hand, the electron-beam curing device 100 including the electron emitting element 10 can operate in the atmosphere, and therefore does not need to be sealed in vacuum. In addition, since the electron emitting element 10 is improved in the amount of electrons being emitted, the electron-beam curing device 100 can perform the irradiation with electron beams efficiently. Further, the electron-beam curing device is free from energy loss, because the electrons do not pass through the electron window. This allows reduction of the voltage being applied. Moreover, since the electron-beam curing device has a planar electron source, the throughput increases significantly. When electrons are emitted in accordance with a pattern, maskless exposure will be possible.

Embodiment 5

Figure 7:
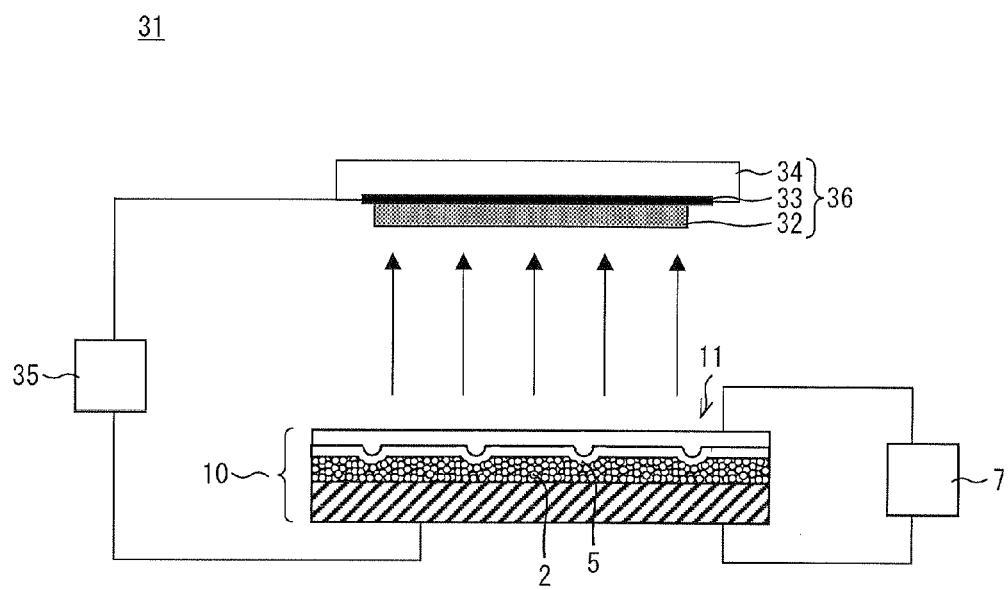
FIG. 7 is a drawing illustrating an example of a light emitting device including an electron emitting element of the present invention.
Figure 8:
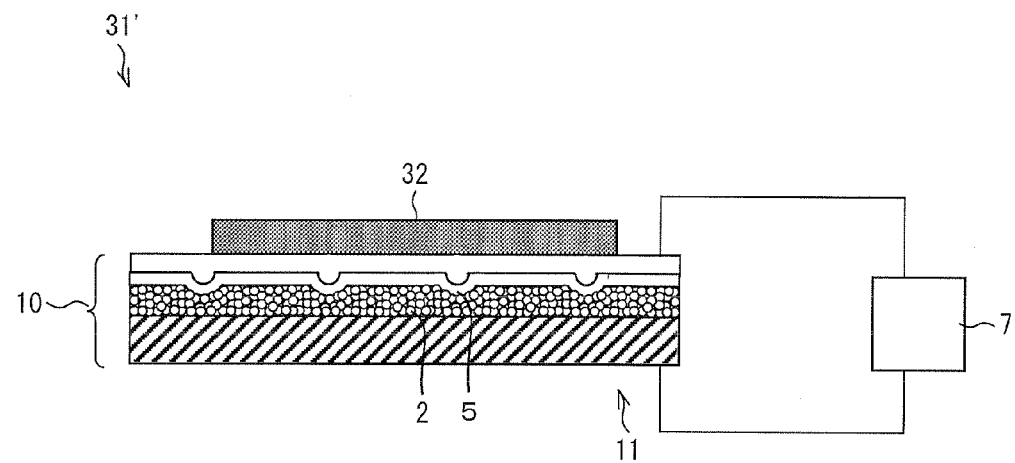
FIG. 8 is a drawing illustrating another example of a light emitting device including an electron emitting element of the present invention.
Figure 9:
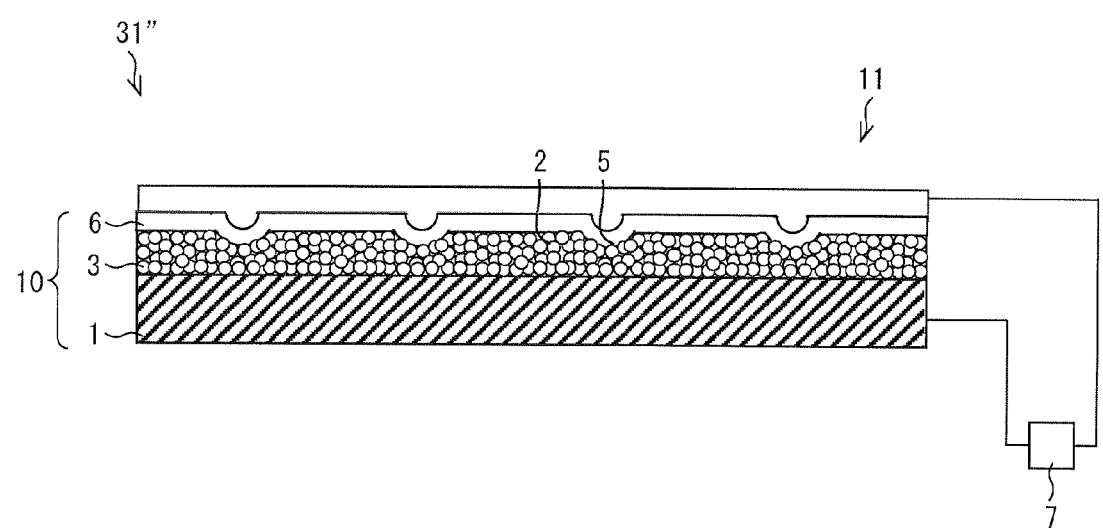
FIG. 9 is a drawing illustrating still another example of a light emitting device including an electron emitting element of the present invention.

FIGS. 7 to 9 each illustrate an example of a light emitting device including the electron emitting element 10 described in Embodiment 2.

A light emitting device 31 illustrated in FIG. 7 comprises an electron emitting device having the electron emitting element 10 and the power supply 7 for applying a voltage to the electron emitting element 10; and a light-emitting section 36 disposed in a position that is apart from the electron emitting element 10 and that faces the electron emitting element 10. The light-emitting section 36 has a laminated structure including a glass substrate 34 serving as a base material, an ITO film 33 and a fluorescent body 32.

Suitable materials of the fluorescent body 32 are materials that are excited by electrons and that correspond to red light emission, green light emission and blue light emission, respectively. Examples usable as such materials corresponding to red include $Y_2O_3$: Eu and (Y, Gd) $Bo_3$: Eu; examples usable as such materials corresponding to green include $Zn_2SiO_4$: Mn and $BaAl_{12}O_{19}$: Mn; and examples usable as such materials corresponding to blue include $BaMgAl_{10}O_{17}$: $Eu^{2+}$. A film of the fluorescent body 32 is formed on the ITO film 33 formed on a surface of the glass substrate 34. The fluorescent body 32 preferably has a thickness of approximately 1 μm. Further, the ITO film 33 may have any thickness as long as the ITO film 33 can ensure electric conductivity. In the present embodiment, the ITO film 33 has a thickness of 150 nm.

For forming the film of the fluorescent body 32, a mixture of an epoxy resin serving as a binder and fluorescent fine particles is prepared, and a film of the mixture may be formed by a known method such as a bar coater method and a dropping method. In the present embodiment, in order to increase the brightness of light emitted from the fluorescent body 32, it is necessary to accelerate, toward the fluorescent body, electrons emitted from the electron emitting element 10. In this case, a second power supply 35 should be provided between the electrode substrate 1 of the electron emitting element 10 and the ITO film 33 of the light-emitting section 36 in order to apply a voltage for forming an electric field for accelerating the electrons. In this case, it is preferable that: the distance between the fluorescent body 32 and the electron emitting element 10 is 0.3 mm to 1 mm; the voltage being applied by the power supply 7 is 18V; and the voltage being applied by the second power supply 35 is 500 V to 2000 V.

A light emitting device 31' illustrated in FIG. 8 comprises the electron emitting element 10, the power supply 7 for applying a voltage to the electron emitting element 10, and the fluorescent body 32. In the light emitting device 31', the fluorescent body 32 is planar and disposed on a surface of the electron emitting element 10. In the present embodiment, a layer of the fluorescent body 32 is formed on the surface of the electron emitting element 10 in such a manner that a mixture of an epoxy resin serving as a binder and fluorescent fine particles is prepared as a coating solution as described above and a film of the mixture is formed on the surface of the electron emitting element 10. Since the structure of the electron emitting element 10 itself is vulnerable to external force, the element may be damaged as a result of the use of the bar coater method. It is therefore preferable to use the dropping method or the spin coating method.

A light emitting device 31" illustrated in FIG. 9 comprises the electron emitting device 11 having the electron emitting element 10 and the power supply 7 for applying a voltage to the electron emitting element 10. Further, in the electron acceleration layer 3 of the electron emitting element 10, fluorescent fine particles as a fluorescent body 32' are mixed. In this case, the fine particles of the fluorescent body 32' may serve also as the insulating fine particles 2. Generally, however, the fluorescent fine particles have a low electric resistance, which is obviously lower than the electric resistance of the insulating fine particles 2. Therefore, when the fluorescent fine particles are mixed instead of the insulating fine particles 2, the amount of the fluorescent fine particles should be kept to a small amount. For example, when spherical silica particles (average diameter: 110 nm) are used as the insulating fine particles 2 and ZnS:Mg (average diameter: 500 nm) is used as the fluorescent fine particles, they are appropriately mixed at a ratio by weight of approximately 3:1.

In the light emitting devices 31, 31', 31", electrons emitted from the electron emitting element 10 are caused to collide with the corresponding fluorescent bodies 32, 32' so that light is emitted. Since the electron emitting element 10 is improved in the amount of electrons being emitted, the light emitting devices 31, 31', 31" can emit light efficiently. While the light emitting devices 31, 31', 31" can operate in the atmosphere, the light emitting devices 31, 31', 31" can emit light more efficiently when sealed in vacuum to increase the electron emission current.

Figure 10:
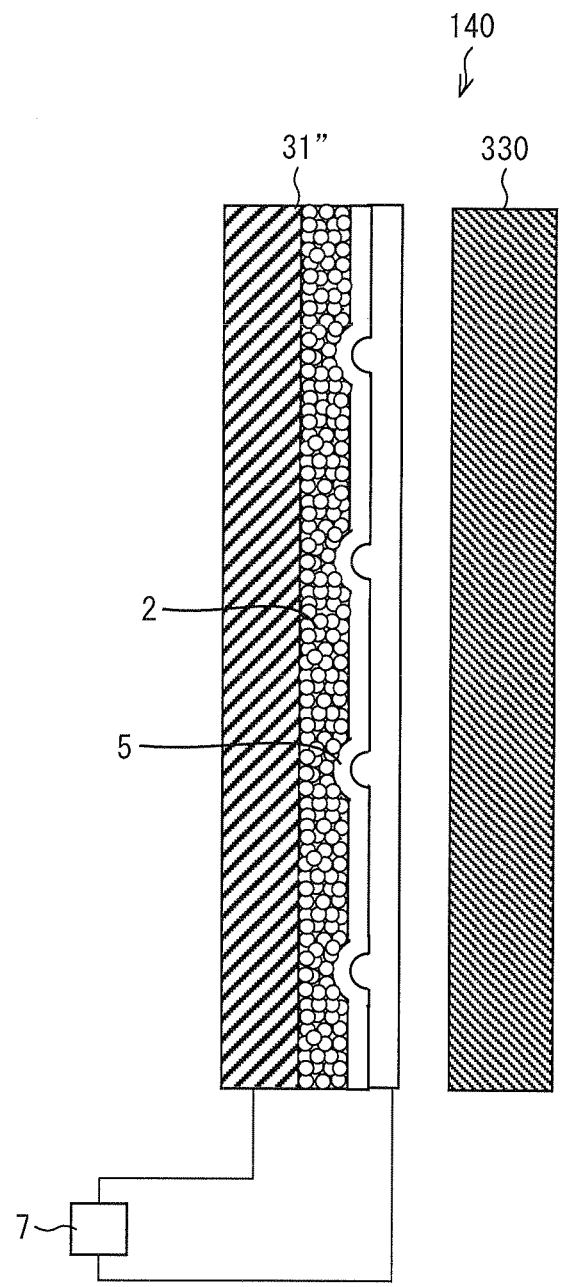
FIG. 10 is a drawing illustrating an example of an image forming apparatus equipped with a light emitting device including an electron emitting element of the present invention.

Further, FIG. 10 illustrates an example of an image display device including a light emitting device according to the present embodiment. An image display device 140 illustrated in FIG. 10 comprises the light emitting device 31" illustrated in FIG. 9 and a liquid crystal plane 330. In the image display device 140, the light emitting device 31" is disposed behind the liquid crystal panel 330 and used as a backlight. When the light emitting device 31" is used in the image display device 140, it is preferable that a voltage of 20 V to 35 V is applied to the light emitting device 31". The light emitting device 31" should be configured to emit, for example, 10 $\mu A/cm^2$ of electrons per unit time at the voltage of 20 V to 35 V. Further, it is preferable that the distance between the light emitting device 31" and the liquid crystal panel 330 is approximately 0.1 mm.

When the light emitting device 31 illustrated in FIG. 7 is used for the image display device according to the embodiment of the present invention, a plurality of the light emitting devices 31 may be arranged in a matrix so as to form a shape that allows the light emitting devices 31 themselves serving as an FED to form and display an image. In this case, it is preferable that a voltage of 20 V to 35 V is applied to the light emitting devices 31. The light emitting devices 31 should be configured to emit, for example, 10 $\mu A/cm^2$ of electrons per unit time at the voltage of 20 V to 35 V.

Embodiment 6

Figure 11:
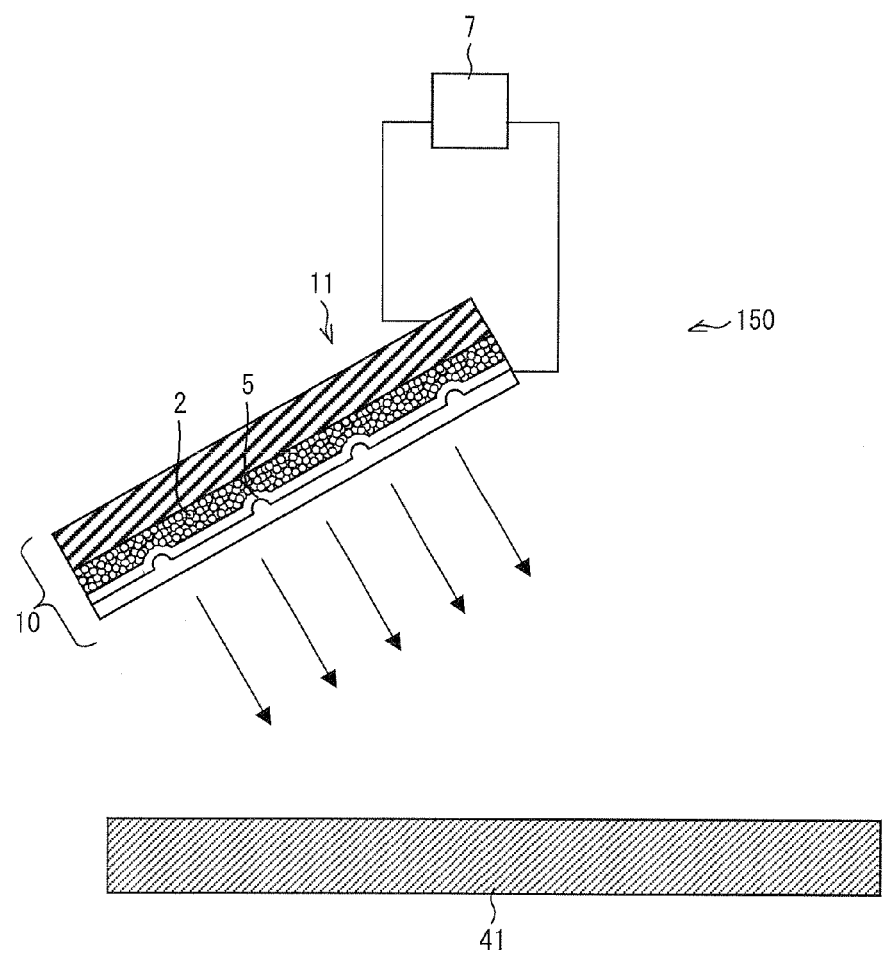
FIG. 11 is a drawing illustrating an example of an air blowing device including an electron emitting element of the present invention and a cooling device equipped with the air blowing device.
Figure 12:
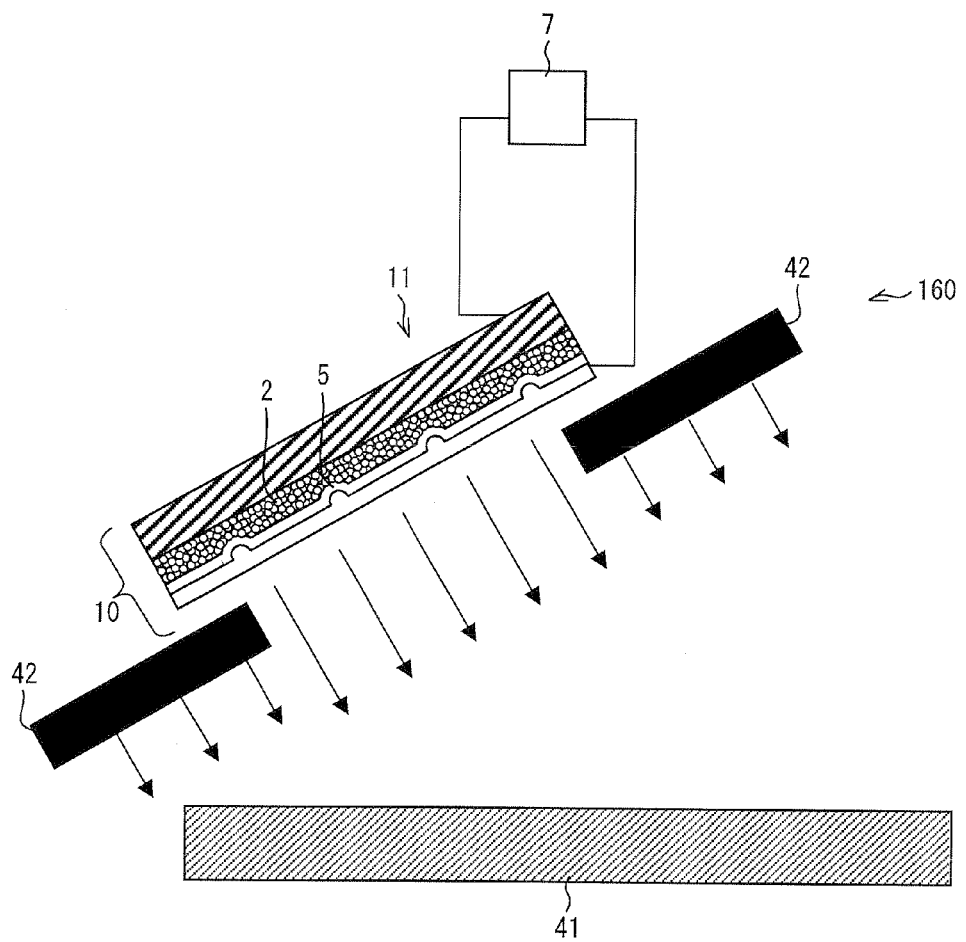
FIG. 12 is a drawing illustrating another example of an air blowing device including an electron emitting element of the present invention and a cooling device equipped with the air blowing device.

FIGS. 11 and 12 each illustrate an example of an air blowing device including the electron emitting element 10 described in Embodiment 2. The following description will be on the assumption that the air blowing device is used as a cooling device. However, application of the air blowing device is not limited to a cooling device.

An air blowing device 150 illustrated in FIG. 11 comprises an electron emitting device 11 having the electron emitting element 10 and the power supply 7 for applying a voltage to the electron emitting element 10. In the air blowing device 150, the electron emitting element 10 emits electrons toward an object 41 to be cooled so that ion wind is generated and the object 41 electrically grounded is cooled. In the cooling, it is preferable that a voltage of approximately 18 V is applied to the electron emitting element 10 and the electron emitting element 10 emits, for example, 1 $\mu A/cm^2$ of electrons per unit time in the atmosphere at the voltage.

In addition to the configuration of the air blowing device 150 illustrated in FIG. 11, an air blowing device 160 illustrated in FIG. 12 includes a blowing fan 42. In the air blowing device 160 illustrated in FIG. 12, the electron emitting element 10 emits electrons toward an object 41 to be cooled, and the blowing fan 42 blows air toward the object 41 to send the electrons emitted from the electron emitting element toward the object 41 and generate ion wind so that the object 41 electrically grounded is cooled. In this case, it is preferable that an air volume generated by the blowing fan 42 is 0.9 L to 2 L per minute per square centimeter.

When the object 41 is cooled only by air blown by a fan or the like as in the case of a conventional air blowing device or a conventional cooling device, the flow rate on a surface of the object 41 will be 0 and the air in a section from which heat is dissipated the most desirably is not replaced, leading to low cooling efficiency. However, when electrically charged particles such as electrons or ions are included in the air blown, the air blown is attracted to the surface of the object 41 by electric force when in the vicinity of the object 41 to allow the air in the vicinity of the surface of the object 41 to be replaced. Since the air blowing devices 150, 160 according to the present embodiment blow air including electrically charged particles such as electrons or ions, the cooling efficiency is significantly improved. Furthermore, since the electron emitting element 10 is improved in the amount of electrons being emitted, the air blowing devices 150, 160 can perform the cooling more efficiently. The air blowing devices 150, 106 can operate also in the atmosphere.

The present invention is not limited to the embodiments and the examples described above, and various other changes may be made within the scope of the invention as defined by the appended claims. That is, other embodiments obtained by combining technical means appropriately changed within the scope of the present invention as defined by the appended claims are also included in the technical scope of the present invention. For example, the electron emitting element of Embodiment 1 may be applied to the devices of Embodiments 3 to 6.

Industrial Applicability

An electron emitting element of the present invention can emit a sufficient amount of electrons by application of a moderate voltage and can continuously operate for a longer time. Accordingly, the electron emitting element of the present invention can be suitably applied to, for example, a charging device of an image forming apparatus such as an electrophotographic copying machine, a printer and a facsimile; an electron-beam curing device; an image display device when in combination with a fluorescent body; and a cooling device when utilizing ion wind generated by electrons emitted therefrom.

What is claimed is:

1. An electron emitting element, comprising:
   a first electrode;
   an insulating fine particle layer formed on the first electrode and composed of insulating fine particles; and
   a second electrode formed on the insulating fine particle layer, wherein the insulating fine particle layer is provided with recesses formed in a surface thereof, the surface facing the second electrode, the recesses each having a depth smaller than a thickness of the insulating fine particle layer,
   when a voltage is applied between the first electrode and the second electrode, electrons provided from the first electrode are accelerated in the insulating fine particle layer to be emitted though the second electrode, and
   wherein the recesses are obtained by forming a layer containing the insulating fine particles and organic fine particles on the first electrode so that the layer has a thickness larger than a maximum diameter of the organic fine particles, and then decomposing the organic fine particles.

2. The electron emitting element according to claim 1, wherein the recesses are coated with a carbon thin film.

3. The electron emitting element according to claim 1, wherein the recesses have a maximum diameter of 5 nm to 1000 nm.

4. The electron emitting element according to claim 1, wherein the insulating fine particle layer is formed to have a thickness of 8 nm to 3000 nm.

5. The electron emitting element according to claim 1, wherein the insulating fine particles have an average particle diameter of 5 nm to 1000 nm.

6. The electron emitting element according to claim 1, wherein the insulating fine particles are formed of at least one insulator of $SiO_2$, $Al_2O_3$ and $TiO_2$.

7. The electron emitting element according to claim 1, wherein the second electrode is formed of at least one metal of gold, silver, tungsten, titanium, aluminum and palladium.

8. A light emitting device comprising the electron emitting element according to claim 1 and a fluorescent body, wherein the electron emitting element emits electrons to the fluorescent body to cause the fluorescent body to emit light.

9. An image display device comprising the light emitting device according to claim 8.

10. An air blowing device comprising the electron emitting element according to claim 1, wherein electrons are emitted from the electron emitting element to generate ion wind.

11. A cooling device comprising the electron emitting element according to claim 1, wherein electrons are emitted from the electron emitting element to cool an object.

12. A charging device comprising the electron emitting element according to claim 1, wherein electrons are emitted from the electron emitting element to charge a photoreceptor.

13. An image forming apparatus comprising the charging device according to claim 12.

14. An electron-beam curing device comprising the electron emitting element according to claim 1.

15. An electron emitting device comprising the electron emitting element according to claim 1, and a power supply for applying a voltage between the first electrode and the second electrode.

16. An electron emitting element, comprising:
    a first electrode;
    an insulating fine particle layer formed on the first electrode and composed of insulating fine particles; and
    a second electrode formed on the insulating fine particle layer, wherein the insulating fine particle layer is provided with recesses formed in a surface therof, the surface facing the second electrode, the recesses each having a depth smaller than a thickness of the insulating fine particle layer,
    when a voltage is applied between the first electrode and the second electrode, electrons provided from the first electrode are accelerated in the insulating fine particle layer to be emitted though the second electrode,
    wherein the recesses have a distribution density of 1 recess/11 $m^2$ to 100 recesses/$pm^2$.

17. A method for producing an electron emitting element, which includes: a first electrode; an insulating fine particle layer formed on the first electrode and composed of insulating fine particles; and a second electrode formed on the insulating fine particle layer, wherein the insulating fine particle layer is provided with recesses formed in a surface thereof, the surface facing the second electrode, the recesses each having a depth smaller than a thickness of the insulating fine particle layer, and when a voltage is applied between the first electrode and the second electrode, electrons provided from the first electrode are accelerated in the insulating fine particle layer to be emitted though the second electrode, the method comprising:

a layer formation step of fanning, on the first electrode, a layer containing the insulating fine particles and organic fine particles and having a thickness larger than the organic fine particles;

an insulating fine particle layer formation step of forming the insulating fine particle layer by decomposing the organic fine particles in the layer formed on the first electrode to form recesses in a surface of the layer; and a step of forming the second electrode on the insulating fine particle layer and opposite the first electrode.

18. The method for producing the electron emitting element according to claim 17, further comprising a step of coating the recesses with a carbon thin film.

19. The method for producing the electron emitting element according to claim 17, wherein the layer formation step includes a step of forming the layer by applying a dispersion onto the first electrode, the dispersion containing the insulating fine particles and the organic fine particles dispersed therein, and the insulating fine particle layer formation step includes a step of heat-treating the layer formed on the first electrode and thereby decomposing the organic fineparticles to form the recesses in the surface of the layer.

20. The method for producing the electron emitting element according to claim 19, wherein the dispersion contains organic fine particles having an average particle diameter of 5 nm to 1000 nm dispersed therein and the formed layer has a thickness of 8 nm to 3000 nm.

21. The method for producing the electron emitting element according to claim 19, wherein the layer formation step is a step of applying the dispersion by a spin coating method.

22. The method for producing the electron emitting element according to claim 19, wherein the layer formation step includes a step of applying a dispersion obtained by dispersing the insulating fine particles and the organic fine particles in an aqueous solvent.

* * * * *